United States Patent [19]
Young et al.

[11] Patent Number: 5,262,976
[45] Date of Patent: Nov. 16, 1993

[54] PLURAL-BIT RECODING MULTIPLIER

[75] Inventors: William R. Young, Palm Bay; Christopher W. Malinowski, Melbourne Beach, both of Fla.

[73] Assignee: Harris Corporation, Melbourne, Fla.

[21] Appl. No.: 973,932

[22] Filed: Nov. 9, 1992

Related U.S. Application Data

[63] Continuation of Ser. No. 434,798, Nov. 13, 1989, abandoned.

[51] Int. Cl.$^5$ ............................................. G06F 7/52
[52] U.S. Cl. .................................................. 364/760
[58] Field of Search ......... 364/736, 754, 757, 759–760

[56] References Cited

U.S. PATENT DOCUMENTS

| | | | |
|---|---|---|---|
| 4,130,878 | 12/1978 | Balph et al. | 364/758 |
| 4,575,812 | 3/1986 | Kloker et al. | 364/760 |
| 4,638,449 | 1/1987 | Frey | 364/760 |
| 4,646,257 | 2/1987 | Essig et al. | 364/760 |
| 4,700,323 | 10/1987 | Renner | 364/724 |
| 4,761,756 | 8/1988 | Lee et al. | 364/760 X |
| 4,769,819 | 9/1988 | Matsutani et al. | 371/38 |
| 4,791,601 | 12/1988 | Tanaka | 364/760 |
| 4,864,528 | 9/1989 | Nishiyama et al. | 364/760 X |
| 4,868,778 | 9/1989 | Disbrov | 364/757 |
| 4,879,677 | 11/1989 | Shiraishi | 364/760 |

FOREIGN PATENT DOCUMENTS 0398568 11/1990 European Pat. Off. .
8505705 12/1985 PCT Int'l Appl. .

OTHER PUBLICATIONS

Morales et al., "Arithmetic Redundancy-A Gateway to Faster, More Reliable Computing", ESD: The Electronic System Design Magazine, Nov. 1988 pp. 89–96.
A VLSI Signal Processor with Complex Arithmetic Capability, Bahman Barazesh et al. 1988 IEEE, pp. 495–505.
Fast-LSI, Richard, M. B. et al. Fairchild Camera and Inst., May, 1984.
Multiplication Using 2's Complement Numbers, IBM Technical Disclosure Bulletin, Jul. 1966, vol. 9 No. 2, pp. 171–173.
Parallel Architecture Modified Booth Multiplier Cooper, A. R., IEEE Proceedings, vol. 135, pp. 125–129, Jun. 1988.
Digital CMOS Circuit Design, Annaratone, Marco Kluwer Academic Publishers, pp. 222–223.
"VLSI Array Processors", S. Y. Kung, Prentice Hall, 1988, pp. 480–487.
"Single-Chip Digital Multipliers Form Basic DSP Building Blocks", by Willard Buckley, et al., Apr. 1, 1981, pp. 153–163.
"LSI Hardware Implements Signal Processing Algorithms", W. J. Finn from Computer Design vol. 19 No. 3, Mar. 1980, pp. 137–142.
"Multiplication & Division" by R. Peterson & F. Hill, from Digital Mysteries: Hordwarge Organization and Design, John Wiley & Sons, 1973, pp. 350–360.
"Digital CMOS Circuit Design", KGUWER Academic Publishers, 1986, pp. 211–213.

Primary Examiner—Tan V. Mai
Attorney, Agent, or Firm—Charles C. Krawczyk; Ferdinand M. Romano; Joel I. Rosenblatt

[57] ABSTRACT

A recoding method of two or more bit groups to reduce the number of partial products and their hardware implementation. Unique complementing scheme, pre-addition of complementing carriers and derivation of sign extensions also reduce hardware implementation as well as allowing the multiplier to handle any combination of input and output formats The principles are also applied to multiplier/accumulators and complex multipliers.

55 Claims, 11 Drawing Sheets

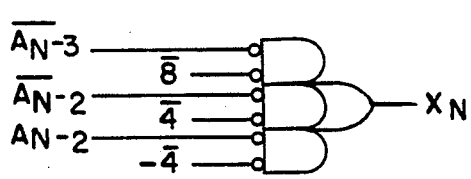
*FIG. 9a*
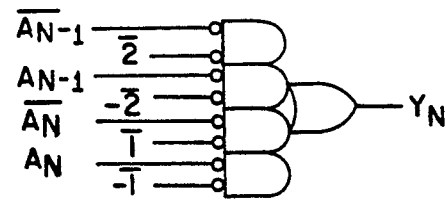
*FIG. 9b*
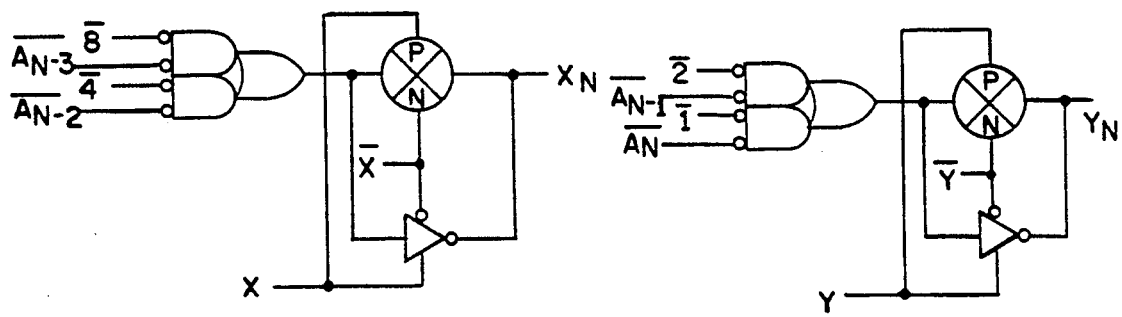
*FIG. 10a*  *FIG. 10b*
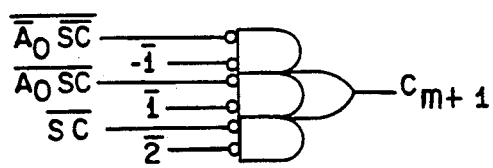
*FIG. 12a*
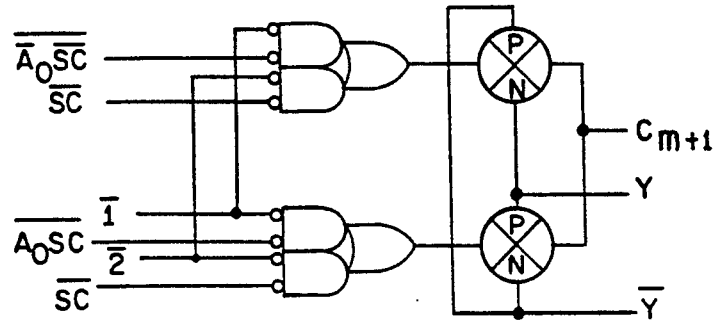
*FIG. 12b*

PLURAL-BIT RECODING MULTIPLIER

This is a continuation of copending application Ser. No. 07/434,798 filed on Nov. 13, 1989, now abandoned.

BACKGROUND AND SUMMARY OF THE INVENTION

The present invention relates generally to binary multipliers and more specifically to an improved speed binary multiplier capable of multiplying signed and unsigned operands.

All modern fast binary multipliers utilize some variations of the basic partial product generation technique first applied by Seymour Cray and commonly referred to as "combinational", "paper and pencil", or "flow-through". In its most common form the technique simply involves consecutive multiplications of a K-digit long operand A (multiplicand) by a single digit B(m) of the M-digit long operand B (multiplier) and then shifting the resultant partial product P(m) to the left by the number of places equal to the position of the digit B(m) in the multiplier. In this particular case it is assumed that the number of places the partial product is to be shifted is directly equal to m. The shifting operation is, in fact, equivalent to the multiplication of the multiplicand by the weight of the decimal (or binary) digit B(m).

After generating all M partial products, they are then consecutively summed to yield the final (M+K) digit-long final product of A and B. This technique, used for decimal number multiplication is also directly applicable to the principle of binary multiplication of two numbers A and B, their respective binary widths being K and M. The example of multiplication of such 4-bit operands A=0111=7 and B=0011=3 is given in Table 1.

TABLE 1

| "Paper-and-pencil" multiplication of two 4-bit operands. | | |
|---|---|---|
| MULTIPLICAND A: 0 1 1 1 | | = 7 |
| MULTIPLIER B: 0 0 1 1 | | = 3 |
| | 0 1 1 1 | pp 1 |
| | 0 1 1 1 | pp 2 |
| | 0 0 0 0 | pp 3 |
| | 0 0 0 0 | pp 4 |
| 0 0 0 1 0 1 0 1 = 21 final product | | |

The ability to multiply signed numbers is more difficult. In a two's-complement notation when the most significant bit is a zero it is designated as a positive number, whereas when the most significant bit is a 1 it is designated as a negative number. One way to perform multiplication of two's complement numbers is to convert the negative numbers to their positive binary representation, multiply the positive or unsigned versions and attach the appropriate sign using the law of signs. If both the operands have the same sign, the unsigned product would be the product, since it is positive. If either of the operands were negative, the two's complement negation of the product must be performed.

An alternative to the conversion to an unsigned magnitude and reconversion of the final product is illustrated in Table 2.

TABLE 2

| Multiplication of Two's Complement Operands with Sign Extension. | | | |
|---|---|---|---|
| | 1 0 0 1 | (Multiplicand) | = −7 |
| | x 1 1 0 1 | (Multiplier) | = −3 |
| PP #1 | 1 0 0 1 — | Extended Sign | = 1111001 |
| PP #2 | 0 0 0 0 — | Extended Sign | = 000000 |
| PP #3 | 1 0 0 1 — | Extended Sign | = 11001 |
| PP #4 | 1 0 0 1 | — Two's Complement | = 0111 |
| | | Final Product 21 | = 0010101 |

The first three partial products are performed with sign extension. The fourth partial product, which is the sign bit, is converted to a two's complement notation before addition with the other partial products. This is to correct for the negative sign bit in combination with the sign extension.

As in apparent from Tables 1 and 2 besides some input and output reformatting of the operands and final product, the bulk of multiplication time, even in its simplest form, is consumed by the M−1 additions required to generate the sum of partial products In fact, all the algorithmic speed improvements brought into the design of parallel multipliers have involved the reduction of the number of additions necessary to generate the final product, as well as acceleration of the necessary additions (application of "Carry-save" adders). The most common techniques used today employ algorithmic refinements of the basic concept described above; they are known as "Wallace Tree Partial Product Reduction" and "Modified Booth Algorithm".

Application of these two techniques combined leads to the potential reduction of the necessary number of partial product additions to one half the number of bits in the multiplier. Consequently, the amount of time necessary for the partial products to flow through the adder array is also cut in half. However, this is accomplished at the expense of using a relatively complex Booth decoder.

Booth algorithms, compared to the present invention, introduces not only extra delays caused by a more complex Booth Decoder, but also results in increased circuit size due to the need of propagating the sign extension through the CSA (Carry Save Adder) array. This also leads to poorer time performance. For example, in Table 1, partial products 1, 2 and 3 would include three, two and one sign extending bits, respectively.

Thus, using the example of Table 1, the Booth multiplication increases generally quadratically with the number of partial products that must be performed, whereas the combinational multiplication of Table 1 varies linearly with the number of bits.

The original Booth algorithm and the modified Booth algorithm involve searching for and determining strings of zeros or ones in the multiplier and performing addition and subtraction for the different partial products depending upon a determination of the beginning, end or middle of the string.

In combinational multiplication, a relative 1-digit shift always occurs between the multiplicand and the partial sum, regardless of whether an addition has occurred or not. Booth's algorithm permits more than one shift at a time, depending on the grouping of ones and zeros in the multiplier bit by bit, starting with the LSB, shifting the partial product relative to the multiplicand as each bit is examined. Subtract the multiplicand from the partial product when you find the first one in a string of ones. Similarly, upon finding the first zero in a string of zeros, add the multiplicand to the partial product. Perform no operation when the bit examined is identical to the previous multiplier bit.

A modified version of Booth's algorithm is more commonly used. The difference between the Booth's and the modified Booth's algorithm is as follows: The modified Booth always generates m/2 independent partial products, whereas the original Booth generates a varying (at most m/2) number of partial products, depending on the bit pattern of the multiplier. Of course, parallel hardware implementation lends itself only to the fixed independent number of partial products. The modified multiplier encoding scheme encodes 2-bit groups and produces five partial products for an 8-bit multiplier, the fifth partial product being a consequence of the fact that the algorithm only handles two's complement numbers.

The most conventional modified Booth scheme is to consider a bit-pair in each step, i.e., bit-pair recoding. The multiplier bits are divided into 2-bit pairs, and 3 bits (a triplet) are scanned at a time, two-bits form the present pair and the third bit (the overlap bit) from the high-order bit of the adjacent lower-order pair. After examining each bit-pair, the algorithm converts them into a set of 5 signed digits 0, +1, +2, −1 and −2. According to the Boolean truth table shown in Table 3, each recoded digit performs only a simplified processing on the multiplicand, such as add, subtract, or shift.

TABLE 3

Truth table for the modified Booth algorithm with bit-pair recoding

| Multiplier bit triplet | | | The recorded operand | |
|---|---|---|---|---|
| $2^1$ $b_{m+1}$ | $2^0$ $b_m$ | $2^{-1}$ $b_{m-1}$ | $b_m$ | Remark |
| 0 | 0 | 0 | 0 | no string |
| 0 | 0 | 1 | 1 | end of string |
| 0 | 1 | 0 | 1 | isolated 1 |
| 0 | 1 | 1 | 2 | end of string |
| 1 | 0 | 0 | −2 | begin of string |
| 1 | 0 | 1 | −1 | end/begin of string |
| 1 | 1 | 0 | −1 | begin of string |
| 1 | 1 | 1 | 0 | center of string |

The application of the modified Booth algorithm to the example of Table 1 is shown in Table 4. As expected, the final product is the same.

TABLE 4

Multiplication Using Modified Booth

```
            0 1 1 1 = 7
            0 0 1 1 = 3
PP #1        1 0 0 1  −1 — Extended Sign = 11111001
PP #2  0 1 1 1        1 — Extended Sign = 000111
                     Final Product 21 = 00010101
```

State-of-the-art multipliers, such as those employed in DSP (Digital Signal Processing) architectures, should also be capable of performing accumulation of the products, as well as be capable of operating on both unsigned integers and two's complemented binary words.

Thus it is an object of the present invention to provide a recoding scheme which is an improvement over the modified Booth algorithm.

Another object of the present invention is to provide an recoding scheme which is capable of handling signed and unsigned numbers without substantial pre-conditioning.

A still further object of the present invention is to provide a sign extension requiring less hardware.

A still further object of the present invention is to reduce the size of the adder array by selective pre-addition.

A still further object of the present invention is to provide a multiplier/accumulator with product sign extension.

Still an even further object of the present invention is to provide improved mechanisms for taking two's complements of multiplicands and multipliers as well as converting sign magnitude numbers to two's complements.

An even further object of the present invention is to provide an improved complex multiplier requiring fewer registers and multiplexers.

These and other objects are achieved by a recoding system wherein for two-bit pairs. The set of signed digits is reduced from five to four which includes zero. Recoding scheme by special recoding and control of Carry of the most significant bit allows the recoding scheme to accommodate negative two's complement multipliers. The recoding scheme can operate in two-bit, three-bit, four-bit groups etc. For the three-bit, only two additional signed digits are used whereas for a four-bit recoding scheme four additional sign bits are used. The Carryout of the three-bit and four-bit recoding scheme is independent of Carryin.

The sign extension of the partial products is improved by using a single sign extension word for all the sign extensions. The sign extension word SEW is formed as a plurality of negative bits (1) beginning with the sign bit of the first negative partial product and extending the length of the multiplier, except for a positive sign bit (0) for a sign bit of subsequent negative partial products substituted for the corresponding negative bit of the sign extension word SEW. The single sign word SEW is produced by determining and collecting sign bits SE of the partial products as a sign word and two's complementing the sign word to produce the sign extension word SEW.

The number of partial products using the recoded multiplier requires an additional or carry partial product for the Carryout of most significant recoded group. If this extra partial product is negative, the complementing includes adding a complementing Carry. Also as previously discussed, the sign extension word is a complemented operation and therefore a complementing Carry must be added to it also. To reduce the size of the array, the present scheme determines the position of the complementing Carry for the sign extension word and the occurrence of a complementing Carry for the additional partial product and pre-adds these two Carries to the multiplicand of one of the partial products prior to the array. This value is then held until needed. This operation is performed in parallel with the multiplier recording means.

In multiplier/accumulators, the output of the adder array is a sum S and a Carry C of N bits and the sign must be extended to the capacity of the accumulator register. The present multiplier/accumulator produces a product sign extension word PSEW as a function of the multiplicand and multiplier to extend the sum S and the Carry C to the length of the accumulator. The product sign extension word PSEW is produced in parallel with the partial products and the adder array. A final adder adds the sum S the Carry C, the product sign extension word PSEW and the most significant bits of the accumulator register. The final adder includes merging capability for merging the sum S, the Carry C, the sign produce extension word and the most significant bits into two merge words and a simple adder for adding the two merge words. The product sign extension word PSEW is uniquely selected between two possible alternatives so as to merge with the sum S, Carry C and the most significant bits of the accumulator register. The least significant bit of the product sign extension word PSEW can have a one or zero.

The formation of a two's complement may be by adding a one to the one's complement as follows:

$$\begin{array}{r}\overline{A}_{N-1}\,\overline{A}_{N-2} - \overline{A}_1\overline{A}_0 \\ + \qquad\qquad\qquad 1\end{array}$$

or by adding the complement of the first bit to the one's complement of the remaining bits with the first bit uncomplemented as follows:

$$\begin{array}{r}\overline{A}_{N-1}\,\overline{A}_{N-2} - \overline{A}_1\,A_0 \\ + \qquad\qquad\qquad \overline{A}_0\end{array}$$

By providing the appropriate selection of which of the two complementing methods being used, the complement Carry being either the one or $\overline{A}_0$ will be provided in the same place in the adder array. The selectivity of which method depends upon the position of the partial product produced by the recoded multiplier. If a recoded multiplier is two, the first method is used and if the recoded multiplier is one, the second method is used.

The ability to select the method of complementing allows the present system to handle signed magnitude numbers without any substantial processing. For a negative sign magnitude number, the absolute value is stored in the multiplicand register as a one's complement. Whether the Q or $\overline{Q}$ output of the register is selected is a function of a negative or positive partial product and will only require providing a appropriate complementing Carry. This is the only processing needed. For negative sign magnitude multiplier, the one's complement of the absolute value of the multiplier can be provided in the multiplier register and a one is added to the least significant bit during the recoding process.

The multiplier includes a complementor performing two's complements of the multiplicand by loading the multiplicand or the one's complement of the multiplicand into the multiplicand, register depending upon the input format of the multiplicand multiplier and output format of the product. The complementor forms the two's complement by adding a complementing carry if the multiplicand was loaded as a one's complement in the multiplicand register and the recoded multiplier group is positive. The complementor also forms two's complement by adding a complementing carry if the multiplicand was loaded uncomplemented into the multiplicand register and the recoded multiplier group is negative. The storing of the one's complement of the negative multiplicand into the multiplicand register allows this reversal to take place.

The ability to perform the two's complement of a number for a positive or negative partial products reduces the hardware needed in a complex multiplier for multiplying complex numbers (A+jB) and (C+jB). The structure requires four registers with four partial product multiplexers with preadders and a pair of adder arrays.

Other objects, advantages and novel features of the present invention will become apparent from the following detailed description of the invention when considered in conjunction with the accompanying drawings.

BRIEF DESCRIPTION OF THE DRAWINGS

FIGS. 9a and 9b are logic block diagrams of X and Y multiplexers for a four-bit decoder according the principles of the present invention.

FIGS. 10a and 10b are logic block diagrams of alternative X and Y multiplexers for a four-bit recoder scheme according to the principles of the present invention.

FIGS. 12a and 12b are logic diagrams of the partial product complementing carry control according to the principles of the present invention.

DETAILED DESCRIPTION OF THE DRAWINGS

Figure 1:
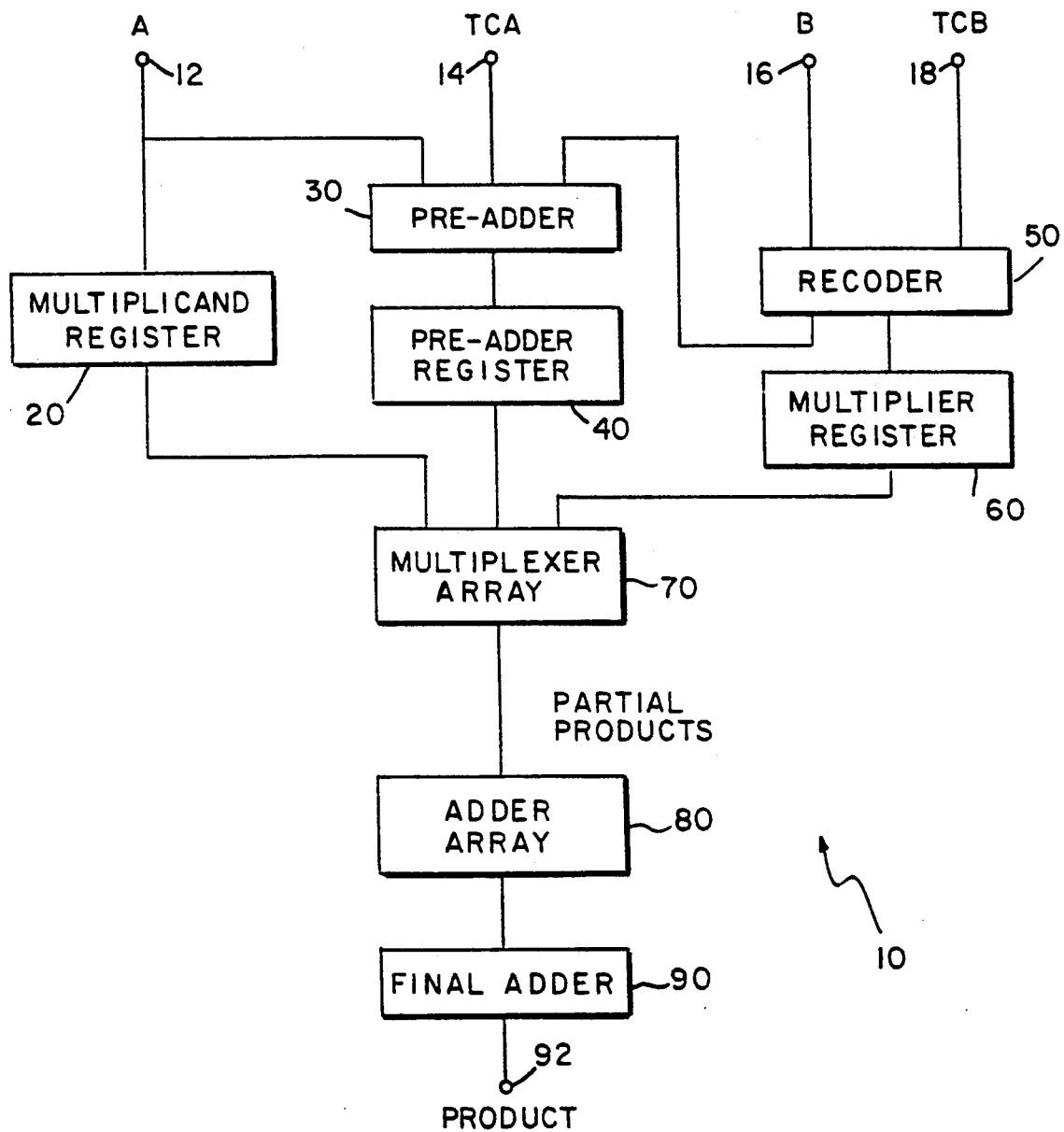
FIG. 1 is a block diagram of a multiplier according the principles of the present invention.

FIG. 1 shows a multiplier 10 according to the present invention including an input port 12 for the multiplicand A, input port 14 for the multiplicand format control TCA, input port 16 for the multiplier B, and input port 18 for the multiplier format control TCB. TCA and TCB stand for Two's Complement Format which are a zero when the numbers are unsigned numbers or 1 when the numbers are two's complement numbers. The input port 12 for the multiplicand A is connected to a multiplicand register 20 and to a pre-adder 30. The multiplicand format controls port 14 is also connected to the pre-adder 30. The multiplier port 16 and the multiplier format control port 18 are both connected to a recoder 50. The output of the recoder 50 is connected to a multiplier register 60 and to the pre-adder 30 and the output of the pre-adder 30 is connected to the pre-adder register 40. A multiplexer array 70 receives inputs from the output of the multiplicand register 20, the pre-adder register 40 and the recoded multiplier register 60. The recoded multiplier register 60 provides the controls for the multiplexer array 70. The output of the multiplexer array 70 are partial products which are provided to adder array 80 which may be for example a Wallace Tree, although other arrays may be provided. The output of the adder array 80 which, are generally a Carry and a Sum, are added in a final adder 90 which provides a final product at output port 92.

As will be discussed more fully below in individual sections, the recoder 50 recodes two or more bits groupings of the multiplier so as to limit the set of signed digits to four including zero while reducing the number of partial products in half. The pre-adder 30 allows the reduction of the array by one additional stage. Unique complementing schemes allow reduction in the array.

BASIC TWO-BIT RECODING

In order to reduce the partial products in half, a pair of bits are recoded such that there is only one multiplication or partial product for the pair of bits.

TABLE 5

| $B_{m+1}$ | $B_m$ | Value | $b_m$ | $C_{m+1}$ |
|---|---|---|---|---|
| 0 | 0 | 0 | 0 | 0 |
| 0 | 1 | 1 | 1 | 0 |
| 1 | 0 | 2 | 2 | 0 |
| 1 | 1 | 3 | −1 | 1 |

As it can be seen from Table 5, the only instance in which there is a need to actually add the two shifted A operands is the value 3, where both bits in the group are equal to 1. It is therefore desirable to reduce the number of possible 1's in the multiplier to an absolute minimum in such a fashion that a correct result of multiplication still can be obtained. The two-bit recoding technique recodes this (1, 1) binary combination into another combination where only one partial product within the group will be generated. This method is based on a simple observation that the value of a two-bit group $(2^{m+1}, 2^m)$ can be equally represented as $(2^{m+2}, -2^m)$ (e.g. Ax3=Ax(4−1)). After such a recoding, a group of two 1's is then replaced by a single −1 in the less significant position of the group, while another 1 is transferred to the next group's less significant position. Table 6 shows an example of the recoding process as applied to two unsigned four-bit numbers:

TABLE 6

| A = 7 = 0 1 1 1 | −A = 1 0 0 1 |
|---|---|
| B = 3 = 0 0 1 1 | |
| 1 1 1 1 1 0 0 1 | −1 PP 1 |
| 0 0 0 1 1 1 | +1 PP 2 |
| 21 = 0 0 0 1 0 1 0 1 | Final Product |

The first bit-pair 11 is equal to −1 with 1 Carry. This produced the first partial product as being the two's complement of 7 with a sign extension. The Carry from the first bit-pair produces a 1 in the second bit-pair.

The coding of Table 5 may be considered the value of the multiplier bits pairs after the Carry from the previous bit-pair has been added thereto. A more complete coding illustrating the bit-pair values with and without a Carry and the resulting multiplexer controls are illustrated in Table 7.

TABLE 7

| $B_{m+1}$ | $B_m$ | $C_{m-1}$ | $b_m$ | $C_{m+1}$ | $TC_m$ | $SH1_m$ | $SH0_m$ |
|---|---|---|---|---|---|---|---|
| 0 | 0 | 0 | 0 | 0 | 0 | 0 | 0 |
| 0 | 0 | 1 | 1 | 0 | 0 | 0 | 1 |
| 0 | 1 | 0 | 1 | 0 | 0 | 0 | 1 |
| 0 | 1 | 1 | 2 | 0 | 0 | 1 | 0 |
| 1 | 0 | 0 | 2 | 0 | 0 | 1 | 0 |
| 1 | 0 | 1 | −1 | 1 | 1 | 0 | 0 |
| 1 | 1 | 0 | −1 | 1 | 1 | 0 | 0 |
| 1 | 1 | 1 | 0 | 1 | 0 | 0 | 0 |

As shown in Table 7, the recoding logic requires the following four multiplexer control signals to feed the partial products into the adder array:

SH0: feed unshifted multiplicand A into the adder row
SH1: feed multiplicand A shifted by one place to the left into the adder row
TC: feed unshifted negated (two's complement) value of A into the adder row
C: add 1 to the less significant bit position of the next Analysis of the control signals of Table 7 produces the following equations [1a]−[1d] for the first bit-pair and equations [2a]−[2d] for subsequent bit-pairs as follows:

$$SH0 = B_0 * \overline{B_1} \quad [1a]$$
$$SH1 = B_0 * B_1 \quad [1b]$$
$$C_0 = B_0 * B_1 \quad [1c]$$
$$TC_0 = C_0 \quad [1d]$$
$$SH0_m = \overline{B_{m+1}} * (B_m \oplus C_{m-1}) \quad [2a]$$
$$SH1_m = \overline{C_{m-1}} * \overline{B_m} * B_{m+1} + C_{m-1} * B_m * \overline{B_{m+1}} \quad [2b]$$
$$C_m = B_{m+1} * (B_m + C_{m-1}) \quad [2c]$$
$$TC_m = B_{m+1} * (B_m \oplus C_{m-1}) \quad [2d]$$

The ability of the recoding technique of Table 7 to be used with two's complement numbers will be explained with respect to Table 8 using the sign correction technique described in co-pending U.S. patent application Ser. No. 07/132,186 filed Dec. 14, 1987 to Disbrow, et al.

TABLE 8

Multiplication Using Two-Bit Recoding with Corrections

| A = −7 | 1 0 0 1 | −A = 0 1 1 1 |
|---|---|---|
| B = −3 = | 1 1 0 1 | −B = 0 0 1 1 |

| | | |
|---|---|---|
| | 1 0 0 1 | 1 PP1 |
| 1 1 0 1 1 1 | | −1 PP2 |
| 1 0 0 1 | | 1 extra or Carryout PP3 |
| 0 1 1 1 | | −A correction |
| 0 0 1 1 | | −B correction |
| 21 = 0 0 0 1 0 1 0 1 | | |

The first bit-pair is recoded as a 1 and produces a first partial product PP 1. The second bit-pair is recoded into a −1 and produces the second partial product PP2 with a Carry of 1 which produces the third partial product PP3. Since the second partial product is a −1, it is considered a negative partial product and therefore is signed extended. This is done ignoring the sign of or treating the negative multiplicand A as a positive number. Using the correction of the Disbrow, et al. patent, a negative A is added since the multiplier B is negative and a negative B is added since the multiplicand A is negative. The final product is a positive 21.

SIGNS SPECIFIC TWO-BIT RECODING

Instead of using the Disbrow corrections, the specific signs of the multiplicand A and the multiplier B may be recognized in producing the recoding and partial products. As you will note the multiplication of Table 8 will be performed in Table 9 using the signs specific recognition.

TABLE 9
Multiplication of Using Two Bit Recoding with Sign Recognition

```
     A = -7   1 0 0 1           -A = 0 1 1 1
     B = -3   1 1 0 1

1 1 1 1 1 0 0 1    1
              0 0 0 1 1 1       -1
              ─────────────
     21 =  0 0 0 1 0 1 0 1
```

It is obvious that Table 9 is substantial simpler than Table 8 requiring only two instead of three partial products and two correction words. Although the multiplier of the first and second partial products are the same in Table 8 and 9, the sign extension is different. In the technique of Table 9, the law of sign applies and recognizes the sign of the multiplicand A as well as the sign of the recoded multiplier b. For the first partial product with the negative multiplier A, the multiplicand $b = +1$ is a negative partial product and therefore is sign extended. Since the second multiplier $b = -1$, the law of signs produces a positive partial product and no sign extension.

The most significant bit-pair (1, 1) has a value of 3 and is equal to a multiplier $b_m = -1$ with a Carryout. In two's complement numbers, the most significant bit being a 1 indicates that it is a negative number and the 1 has a value of $-1$ for the bit position that it is in. Therefore wherein the last bit pair of a two's complement number is (1, 1), this is equal to a $-2+1$ which equals $-1$ with no Carry. Thus using the technique illustrated in Table 9, the logic in determining multiplier b for the most significant bit produces same results wherein the bit-pair is (1, 1) whether it is a two's complement or unsigned number The difference being for a two's complement number, the Carryout is suppressed since the signed bit of a two's complement number cannot produce a Carry.

Other variations in the coding scheme for the most significant bit pair using the two-bit recoding with sign recognition, wherein the multiplier is a two's complement number, is illustrated in Table 10.

TABLE 10

| $B_{M-1}$ | $B_{M-2}$ | $C_{M-3}$ | $b_{M-2}$ |
|---|---|---|---|
| 0 | 0 | 0 | 0 |
| 0 | 0 | 1 | 1 |
| 0 | 1 | 0 | 1 |
| 0 | 1 | 1 | 2 |
| 1 | 0 | 0 | $-2 = +2 +$ negative Carry |
| 1 | 0 | 1 | $-1$ |
| 1 | 1 | 0 | $-1$ |
| 1 | 1 | 1 | 0 |

The comparison between Tables 10 and 7 will illustrate that for the last three recoded numbers in the Table 10, the Carrys are suppressed. Also, the fifth recoded entry in the Table produces a negative Carry. Since an extra partial product will have to be provided in the array for the unsigned recoding, this additional negative Carry will not increase the amount of circuitry. With respect to the coding scheme of Table 10, when compared with Table 7, the multipliers b for the most significant bits are the same whether it is a two's complement or unsigned multiplier. The differences is the Carrys produced. It should also be noted that in Table 7 and Table 10, the recoded multiplier b is the same for the number or value of the bit-pair if their is no Carryin and for the same value after a Carryin has been added. For example, the bit-pair (0, 0) with a Carryin of 1 has a multiplier $b = 1$ as does the bit-pair (0, 1) where there is no Carryin.

It should be noted that although the most significant bit-pair for a multiplier having an even number of bits of (1, 0) with no Carryin may be represented by a $-2$ in Table 10. This is not desired since this would require five sign digits including zero as in the modified Booth versus the four including zero of the present recoding of Tables 7 and 10. Since this additional digit would only be involved with the most significant bit-pair versus the other bit-pairs, it can be used for substantial savings over the modified Booth. For multipliers allowing both two's complement and unsigned numbers, the hardware is already available for the extra product produced for unsigned numbers. The extra product produced by $+2$ and a Carryout of $-1$ of the most significant bit Table 10 implementation is preferred.

For odd number of bits of multiplier B, the recoding scheme of the most significant bit for unsigned odd multipliers is illustrated in Table 11 whereas the coding scheme for two's complement odd number of bits multiplier is illustrated in Table 12.

TABLE 11

| $B_{M-1}$ | $C_{M-2}$ | $b_{M-1}$ |
|---|---|---|
| 0 | 0 | 0 |
| 0 | 1 | 1 |
| 1 | 0 | 1 |
| 1 | 1 | 2 |

TABLE 12

| $B_{M-1}$ | $C_{M-2}$ | $b_{M-1}$ |
|---|---|---|
| 0 | 0 | 0 |
| 0 | 1 | 1 |
| 1 | 0 | $-1$ |
| 1 | 1 | 0 |

The review of Tables 11 and 12 will illustrate that no Carrys are produced since the one-bit final pair will produce either a 0, $-1$ or 2. Thus only a single partial product with no Carry results. Recognizing this, an even number of bits in an unsigned multiplier B requires $M/2+1$ partial products, whereas for an odd number of bits in the multiplier B requires $(M+1)/2$ partial product. Thus for example an eight-bit unsigned multiplier B require the same five partial products as a nine-bit multiplier.

In the case of a two's complement multiplier, the number of partial products generated will be $M/2$ if the number of bits of the multiplier are even and $(M+1)/2$ if the number of bits in the multiplier is odd.

An example of using the two-bit recoding of Table 10 is illustrated in Table 13.

TABLE 13

```
     A =  3   0 0 1 1           -A = 1 1 0 1
     B = -7 = 1 0 0 1

0 0 1 1        1   PP 1
              0 0 1 1 0        2   PP 2
              1 1 0 1         -1   extra partial product
              ─────────────
     -21 = 1 1 1 0 1 0 1 1         Final product
```

Since the multiplicand A is positive and the first two partial products are positive there is no sign extension. The most significant bits of the multiplier are recoded to produce the second partial product of 2 times the multiplicand with a minus Carry. Thus the extra or carry partial product is a −1. The addition of the three partial products produces a −21 which is the product of 3×−7.

Another modification to the two-bit recoding of Tables 7 and 10 is illustrated in Table 14.

TABLE 14

| $B_{m+1}$ | $B_m$ | $C_{m-1}$ | $b_m$ | $C_{m+1}$ |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | −2 | 1 |
| 1 | 0 | 0 | −2 | 1 |
| 1 | 0 | 1 | −1 | 1 |
| 1 | 1 | 0 | −1 | 1 |
| 1 | 1 | 1 | 0 | 1 |

In comparing Table 14 to Table 7, you will note that the fourth and fifth entry has been changed the multiplier $b_m$ from +2 without a Carry to a minus 2 with a Carry. In the two-bit recoding of Table 14, for the most significant bit of a negative two's complement number all the Carrys are suppressed. The last four entries of Table 14 would indicate a negative number if the multiplier B was two's complement, therefore the last four Carrys are suppressed. The Carry of the fourth line is for a positive two's complement number and therefore this Carry would not be suppressed. This would provide simplification over the Table 10 recoding for a negative two's complement multiplier, in that Carrys in the last three entries of the table are suppressed while a special Carry is produced for the fifth line.

The operation of the recoding of Table 14 are illustrated in two examples in Table 15.

TABLE 15

| A = | 3 | 0 0 1 1 | | −A = 1 1 0 1 | |
|---|---|---|---|---|---|
| B = | −7 = | 1 0 0 1 | | | |
| | | 0 0 1 1 | 1 | PP 1 | |
| | 1 1 1 0 1 0 | | −2 | PP 2 | |
| −21 = | 1 1 1 0 1 0 1 1 | | | Final product | |
| A = | −3 | 1 1 0 1 | | −A = 0 0 1 1 | |
| B = | 7 = | 0 1 1 1 | | | |
| | | 0 0 1 1 | −1 | PP 1 | |
| | 0 0 1 1 0 | | −2 | PP 2 | |
| | 1 1 0 1 | | 1 | Extra partial product | |
| −21 = | 1 1 1 0 1 0 1 1 | | | Final product | |

SIGN EXTENSION WORD (SEW)

The process of replicating the leading bit of two's complement number throughout its extended precision width is called sign extension of a two's complement number. The need to propagate potential sign extensions of all partial products throughout the multiplier's adder array contributes significantly to the size of adder array, and the speed at which more significant bits of the result can be computed.

Sign-extended N-bit negative integer A can be viewed as a concatenation of a two's complement of the integer shifted by m bit positions to the left and concatenated with the N-m long string of 1's. Arithmetically, then this operation corresponds to concatenating the shifted negative integer with another integer equal to:

$$P_m = (2^{2N}-1) \times B_m - (2^{N+m}-1) \times B_m + A \times B_m \times 2^m \quad [3]$$

The equation [3] assumes that no recoding has been performed on the multiplier bits $B_m$ and, therefore, sign extension is performed on a negative multiplicand $A<0$ every time $B_m$ is equal to 1. Equation [3] can be re-written in a simplified form as:

$$P_m = 2^{2N} \times B_m - 2^{N+m} \times B_m + A \times B_m \times 2^m \quad [3a]$$

Equation [3a] thus describes the double precision value of a single partial product $P_m$ corresponding to the m-th bit of the multiplier. Consequently, the sum of all M partial products (where M is the number of bits in the multiplier B) will yield the final value of the product of the multiplication:

$$P = \Sigma P_m = \sum_{m=0}^{M-1} (2^{2N} - 2^{N+m}) \times B_m + A \times B_m \times 2^m \quad [4]$$

The sum of equation [4] can be broken into three independent elements:

$$P = \sum_{m=0}^{M-1} 2^{2N} \times B_m - \sum_{m=0}^{M-1} 2^{N+m} \times B_m + \sum_{m=0}^{M-1} A \times B_m \times 2^m \quad [5]$$

The first term of equation [5] represents a sum whose value will fall beyond the numeric range of the final product and, therefore, can be discarded. The third term of equation [5] represents a shifted multiplicand A as if no sign extension was performed (i.e. as if it were a positive number padded with 0's). The middle term constitutes a single binary word to which will be refer to as a Sign Extension Word SEW wherein:

$$SEW = -2^N \sum_{m=0}^{M-1} 2^m \times B_m \quad [6]$$

Equation [6] represents the two's complemented value of the multiplier B, shifted by N binary positions to the left. Therefore, the final result of the multiplication is the sum of the product of the non-sign extended multiplication or the third term of equation [5] and the Sign Extension Word of equation [6].

In the case of the recording, equation [6] will refer to a modified form of SEW, since the sign extension operation can be applied to the m-th partial product in one of two cases: either the multiplicand A is a negative number and the recoded bit $b_m(SHO_m$ or $SH1_m)$ is equal to 1, or the multiplicand A is a positive integer and the recoded bit $b_m$ is negative (i.e. $TC_m = 1$). In practice, a mixture of both instances will occur. As a consequence, the values of bits $B_m$ in equation [6] are modified and the SEW, in general, will no longer be equal to the negated value of B. These modified values of $B_m$, denoted as $E_m$ will still form a new value of SEW:

$$SEW = -2^N \sum_{m=0}^{M-1} 2^m \times E_m \quad [7]$$

which then will have to be two's complemented, shifted by N places to the left and added to the remaining partial products $P_m$:

$$P = SEW + \sum_{m=0}^{M-1} A \times B_m \times 2^m \qquad [8]$$

Table 16 shows the truth table for formation of two-bit groups of SEW depending on the two-bit recoding group value ($B_{m+1}, B_m$), and the sign of the multiplicand A.

TABLE 16

| $B_{m+1}$ | $B_m$ | Group Value | $A \geq 0$ | | $A < 0$ | |
|---|---|---|---|---|---|---|
| | | | $E_{m+1}$ | $E_m$ | $E_{m+1}$ | $E_m$ |
| 0 | 0 | 0 | 0 | 0 | 0 | 0 |
| 0 | 1 | 1 | 0 | 0 | 0 | 1 |
| 1 | 0 | 2 | 0 | 0 | 1 | 0 |
| 1 | 1 | −1+Carry | 0 | 1 | 0 | 0 |

Table 16 thus indicates that SEW is generated by concatenation of two-bit groups SE ($E_{m+1}, E_m$), corresponding to each location of the two bit recoder group. $E_m$ bit is set to 1 whenever either the sign of A is negative and multiplier value of the group is 1 (group (0,1)), or when two-bit recoding was performed on the ($B_{m+1}$, $B_m$) group (1,1) thus recoding a multiplier 3 into −1 and a carry to the next two-bit recoding group when A positive. $E_{m+1}$ bit is set to 1 only when A is negative, and the multiplier value of the ($B_{m+1}$, $B_m$) group is 2 (1,0). Another interpretation of Table 16 is that a zero multiplier group value or zero multiplier is considered positive and the sign extension SE follows the law of signs with a 0 being like signs and a 1 unlike signs except for a the value or sign of the multiplicand A.

An example of forming a single sign extension SEW is illustrated in Table 17.

TABLE 17

```
A = −29          1 0 0 0 1 1
B =  37          1 0 0 1 0 1

1 0 0 0 1 1      1      PP 1
               1 0 0 0 1 1        1      PP 2
             1 0 0 0 1 1 0        2      PP 3

0 1             SE1
                       0 1               SE2
                     1 0                 SE3
                     1 0 0 1 0 1         ΣSE 0 1 1 0 1 1         SEW
−1073 = 1 0 1 1 1 1 0 0 1 1 1 1   Final product SEW +
                                  PP1 + PP2 + PP3
```

Since each of the recoded values b are positive and the multiplicand A is negative, each of the sign extension bit-pairs SE are either in the position one or two for the appropriate bit-pairs. Line 9 is the sum of the sign extension bits SE and line 10 is the two's complement of line 9 which produces the sign extension word SEW. The sign extension word SEW is added to the three partial products to produce the final product. The multiplication of −29 times 37 is equal to −1073. The position of the single digit for the sign extension SE for each partial product is positioned so as to be the next bit following the most significant bit of partial product.

In reviewing the sum of the sign extension SE of Table 17 with respect to the two's complement thereof or sign extension word SEW, it is noted that the sign extension word SEW has a 1 extending from the first bit of the sign extension word to the end except for those positions where sign extension SE of 1 was required for the sign of other partial products wherein a zero has been substituted. Thus the 1 in the third and sixth position of the sum of the sign extensions SE produced a 0 in the sign extension word SEW.

TWO'S COMPLEMENTATION

Generally, two methods of generating the two's complement of a number can be used. In the first one, let A be the multiplicand: $A_{N-1}, A_{N-2} \ldots A_1, A_0$, and $\overline{A}$ its one's complement: $\overline{A}_{N-1}, \overline{A}_{N-2} \ldots \overline{A}_1, \overline{A}_0$. Therefore, two's complement = one's complement plus 1:

$$\text{two's complement of } A = \overline{A}_{N-1} \overline{A}_{N-2} \ldots \overline{A}_1 \overline{A}_0 + 1 \qquad [9]$$

Since:
$$A_0 + 1 = \overline{A}_0 + \text{Carry} \qquad [10]$$
$$\text{Carry} = \overline{A}_0 \cdot 1 = \overline{A}_0 \qquad [11]$$
and
$$\text{Sum} = \overline{A}_0 \oplus 1 = A_0 \qquad [12]$$

another expression for two's complement of A is:

$$\text{two's complement of } A = \overline{A}_{N-1}, \overline{A}_{N-2} \ldots \overline{A}_1, A_0 + \overline{A}_0 \qquad [13]$$

Generation of the two's complemented value of a shifted multiplicand using its one's complement except for the true value of its LSB $A_0$, and adding a Carry $\overline{A}_0$ into the second least significant position $A_1$ (Equation [13]) is only useful if the value of the recoded multiplier group is 1 or −1. In cases where the recoded value of the multiplier group is 2, the method of two's complementation of equation [9] should be used, where a shifted multiplicand is one's complemented, and then a 1 is added into its least significant inverted bit position $\overline{A}_0$. For example, assuming that the multiplicand register contains the true value of the multiplicand A, then:

TABLE 18

| if b=1 | PP = | 0 | $A_{N-1}$, | $A_{N-2} \ldots$ | | $A_1$, | $A_0$ |
| | carry = | | | | | | 0 |
| 2 | PP = | $A_{N-1}$, | $A_{N-2} \ldots$ | | $A_1$, | $A_0$, | 0 |
| | carry = | | | | | 0 | |
| −1 | PP = | 0 | $\overline{A}_{N-1}$, | $\overline{A}_{N-2} \ldots$ | | $\overline{A}_1$, | $A_0$ |
| | carry = | | | | | $\overline{A}_0$ | |
| 0 | PP = | 0 | 0 | $0 \ldots$ | | 0 | 0 |
| | carry = | | | | | 0 | |
| −2 | PP = | $\overline{A}_{N-1}$, | $\overline{A}_{N-2} \ldots$ | | $\overline{A}_1$ | $\overline{A}_{01}$ | 0 |
| | Carry = | | | | | | 1 |

By selecting one of the two methods of two's complementation, the complementing Carry to achieve two's complementation will always be at the second bit location. The type of complementation and the type of the complementing Carry are selected based on the recoded multiplier bit b. You will note from the above that the multipliers b of, +1, −1 +2, −2 are provided in the two's complementation discussion to illustrate that this method of selecting the method of two's produced in the same position can be used with any recoding In certain situations to be discussed below, where the multiplicand or multiplier must be two's complemented before multiplication, for example handling sign magnitude numbers as well as complex multiplication, the ability to select between two different methods of two's complement allows the use of the input with no additional pre-manipulation cycles and little if any additional logic. In these instances, as will be discussed fully below, the one's complement of the number is inserted in the multiplicand register. In the notation of Table 19, the A and $\overline{A}$ indicates the Q and the $\overline{Q}$ sides of the multiplicand register which contains the one complement and is not A and $\overline{A}$ of the inputted value.

TABLE 19

| if b= | | | | | | |
|---|---|---|---|---|---|---|
| 1 | PP = | 0 | $A_{N-1}$, | $A_{N-2}\ldots$ | | $A_1$, $A_0$ |
| | carry = | | | | | $A_0$ |
| 2 | PP = | $A_{N-1}$, | $A_{N-2}\ldots$ | | $A_1$, | $A_0$, 0 |
| | carry = | | | | | 1 |
| $-1$ | PP = | 0 | $\overline{A}_{N-1}$, | $\overline{A}_{N-2}\ldots$ | | $\overline{A}_1$, $\overline{A}_0$ |
| | carry = | | | | | 0 |
| 0 | PP = | 0 | 0 | $0\ldots$ | | 0  0 |
| | carry = | | | | | 0 |
| $-2$ | PP = | $\overline{A}_{N-1}$, | $\overline{A}_{N-2}\ldots$ | | $\overline{A}_1$ | $\overline{A}_{01}$ 0 |
| | Carry = | | | | | 0 |

For the positive partial products or multiplication by positive recoded bits, the two's complementation of the multiplicand must be completed and therefore the complementing Carry is added to the contents of the multiplicand register which is already the one's complement of the multiplicand A. For negative partial products or multiplication by negative recoded bits, the two's complement of the multiplicand is the required result. The $\overline{A}$ output of the multiplicand register is the required two's complement since the input was the two complement of the multiplicand and the one's complement of the input was stored in the multiplicand register.

Thus in effect the scheme of Table 19 delays the completion of two complementation of the input multiplicand since some of the partial products would not require the pre-two's complementing and thus would be wasted steps. Thus by providing the one's complement of a number which requires pre-two's complementing, the value in the multiplicand register is readily converted to the appropriate partial product without time delay and further munipulation. It should be noted that as in Table 18, the complementing Carry is also always in the second bit of the partial product. This results from selecting the appropriate method of complementing.

COMPLEMENTING CARRY PRE-ADDITION

One practical aspect of implementing a 9×9 bit two's complement multiplier, will illustrate methods employed to speed-up the process of adding partial products in the Wallace tree adder array 80. Recoding the 9-bit multiplier will result in five partial products, as shown in Table 20 wherein S is the sign extension SE, P are the partial products and C is the complementing Carry 1 or $\overline{A}$.

TABLE 20

| $2^{17}$ | $2^{16}$ | $2^{15}$ | $2^{14}$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|---|---|---|---|---|---|---|
| S | S | S | S | S | S | S | S | S/$P_0$ | $P_0$ | $P_0$ | $P_0$ | $P_0$ | $P_0$ | $P_0$ | $P_0$ | $P_0$ | $P_0$ |
| | | | | | $C_4$ | $P_1$ | $P_1$ | $P_1$ | $P_1$ | $P_1$ | $P_1$ | $P_1$ | $P_1$ | $P_1$ | $P_1$ | $P_1$ | $C_0$ |
| | | | | $P_2$ | $P_2$ | $P_2$ | $P_2$ | $P_2$ | $P_2$ | $P_2$ | $P_2$ | $P_2$ | $P_2$ | $P_2$ | $P_2$ | $C_1$ | |
| | | $P_3$ | $P_3$ | $P_3$ | $P_3$ | $P_3$ | $P_3$ | $P_3$ | $P_3$ | $P_3$ | $P_3$ | $P_3$ | $P_3$ | $C_2$ | | | |
| $P_4$ | $P_4$ | $P_4$ | $P_4$ | $P_4$ | $P_4$ | $P_4$ | $P_4$ | $P_4$ | $P_4$ | $C_3$ | | | | | | | |

These partial products will be resolved in the Wallace tree adder array 80 into parallel Sum and Carry words progagating through four levels of Carry-Save Adders. The sign extension word SEW and the most significant or extra partial product P both require that a complementing Carry be added to each when their two's complemented value is to be formed. This is always the case with the SEW, initially only a 1's complement $\overline{SEW}$ value is formed during recoding. In the case of the most significant product, $P_4$ the complementing Carry is only added whenever its two's complement value is required for a recoding Carry generated by the most significant bit-pair. These two carries could be added directly in the Wallace tree array. This however would require an extra (4th) level of adder array beginning with the eight bit position $2^8$.

On the other hand, adding these two carries to the least significant bits of the most significant partial product during the recoding time would have no effect on the multiplier latency and adder array count. This process is called Carry Pre-addition. Table 21 list modified values of the multiplicand A (before the shift) as a function of the sign of the multiplier B and B's two least significant bits $B_0$ and $B_1$ for 8×8 and 9×9 bit multipliers. The numbers in Table 21 represent the value added to A of the extra partial product $P_4$. If there is no extra partial produced, the values for the plus sign of B (1 and 2 for 8×8 and 2 and 4 for 9×9) are added to complement the sign extension SE. If the recoded multiplier or carry for the extra partial product is 2, then the values are added to 2A or A shifted one bit.

TABLE 21

| SIGN OF B | | $B_1 \cdot \overline{B}_0$ | $\overline{B}_1 \cdot \overline{B}_0$ |
|---|---|---|---|
| 8×8 | + | A+2 | A+1 |
| | − | $\overline{A}$+3 | $\overline{A}$+2 |
| 9×9 | + | A+4 | A+2 |
| | − | $\overline{A}$+5 | $\overline{A}$+3 |

If B is positive and the first partial product generated by recoding the least significant bit pair of the multiplier $B_1 \cdot \overline{B}_0 = 10$ is A multiplied by 2; therefore, the first partial product ends at bit N or $2^9$, and the SEW begins at bit N+1 or $2^{10}$. Therefore, the complementing carry for the SEW needs to be added at bit N+1 or $2^{10}$ in Table 20. Otherwise, the carry is added at the Nth or $2^9$ bit position, since the SEW begins at bit N or $2^9$ and the first partial product ends at N−1 or $2^8$ in Table 20.

If B is negative, then A is 1's complemented to form $\overline{A}$, and a complementing carry must be added at its first bit position to generate the two's complement value for the extra partial product $P_4$. For Table 20 the complementing carry would be added at the $2^8$ position. This adds one to the value added from the location of the beginning of the SEW. Thus the sign of B selects either A (if B is positive), or two's complement of A (if B is negative).

Close examination of the partial product alignment in the adder array reveals that the first available bit position in the array for a complementing Carry $C_4$ is the bit position $2^{12}$. Consequently the pre-addition must be carried over the first four bits of the extra partial product $P_4$ (8, 9, 10 and 11), if no extra levels are to be added to the array. The result of the pre-addition is generated as active LOW sum bits (i.e. $\overline{C}_2$, $\overline{S}_2$, $\overline{S}_1$, and $\overline{S}_0$) to allow the use of inverting NOR-type multiplexers. The pre-addition sum bits form the least significant bits of the most significant partial product $P_4$. The most significant bits are from A if B is positive, or $\overline{A}$ if B is negative. The carry bit $C_4$ from the pre-addition is added to position N+3 (position $2^{12}$) in the adder array when the most significant partial product is non-zero. If the most significant partial product is zero, then the SEW complement carry is added to either the Nth position $2^9$ (if $B_1 *B_0$), or the N+1st position $2^{10}$ (if $\overline{B}_1 *\overline{B}_0$), to form the true value of SEW.

The case described above applies where both multiplicand and multiplier have an odd number of bits and the multiplier is a two's complement number. Where the multiplier B is an unsigned number, the most significant partial product $P_4$ would have an extra position at $2^{17}$ in Table 20, since the recorded multiplier group may be 0, 1 or 2 wherein for two's complement multipliers recoded multiplier group may be only 1, 0 or −1. Table 22 illustrates the alignment of partial products for the case of 8×8 (even×even) multipliers.

the SEW complementing Carry will use the partial product $P_4$ location in the Wallace tree adder array. $P_{4Z}$ is used to control the pre-adder register output or the SEW complementing Carry through the $P_4$ multiplexer shown in FIG. 5.

Figure 3:
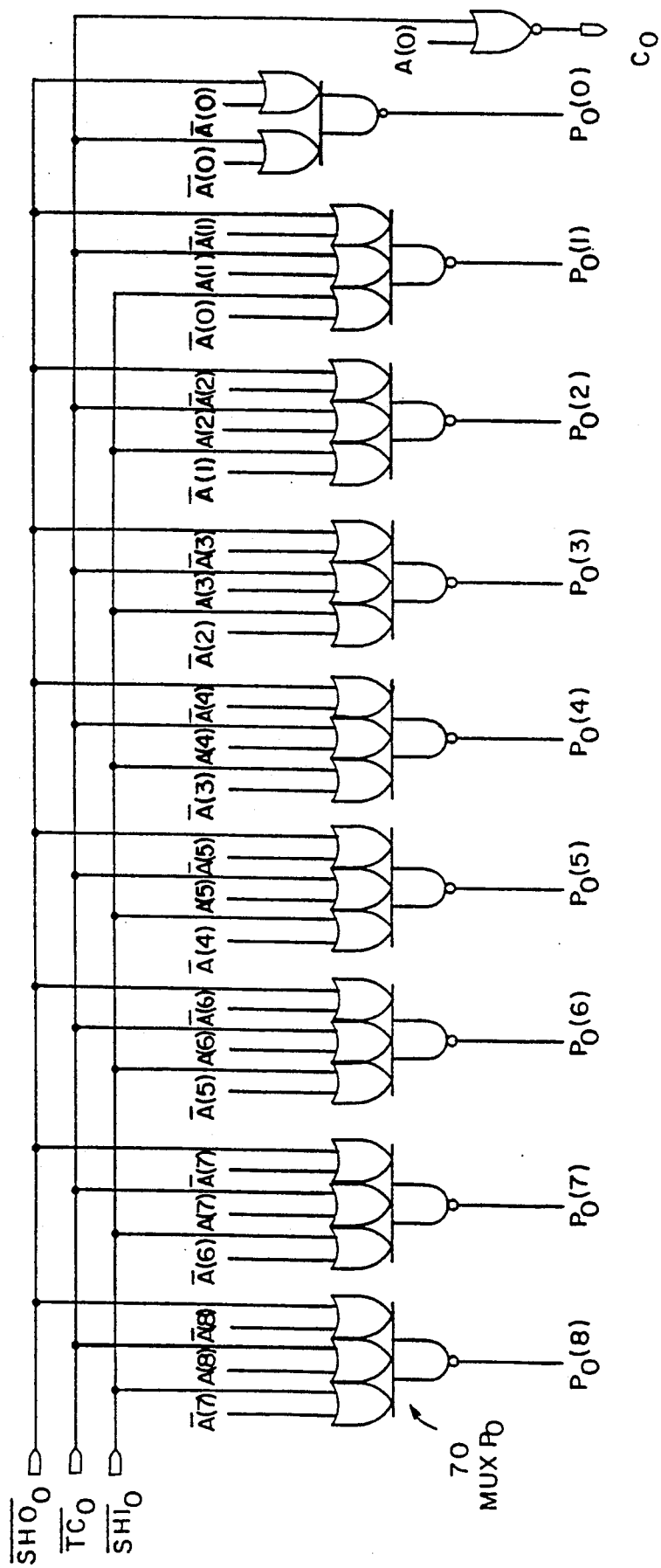
FIG. 3 is a logic diagram of the first partial product $P_0$ multiplexer according to the principles of the present invention.
Figure 4:
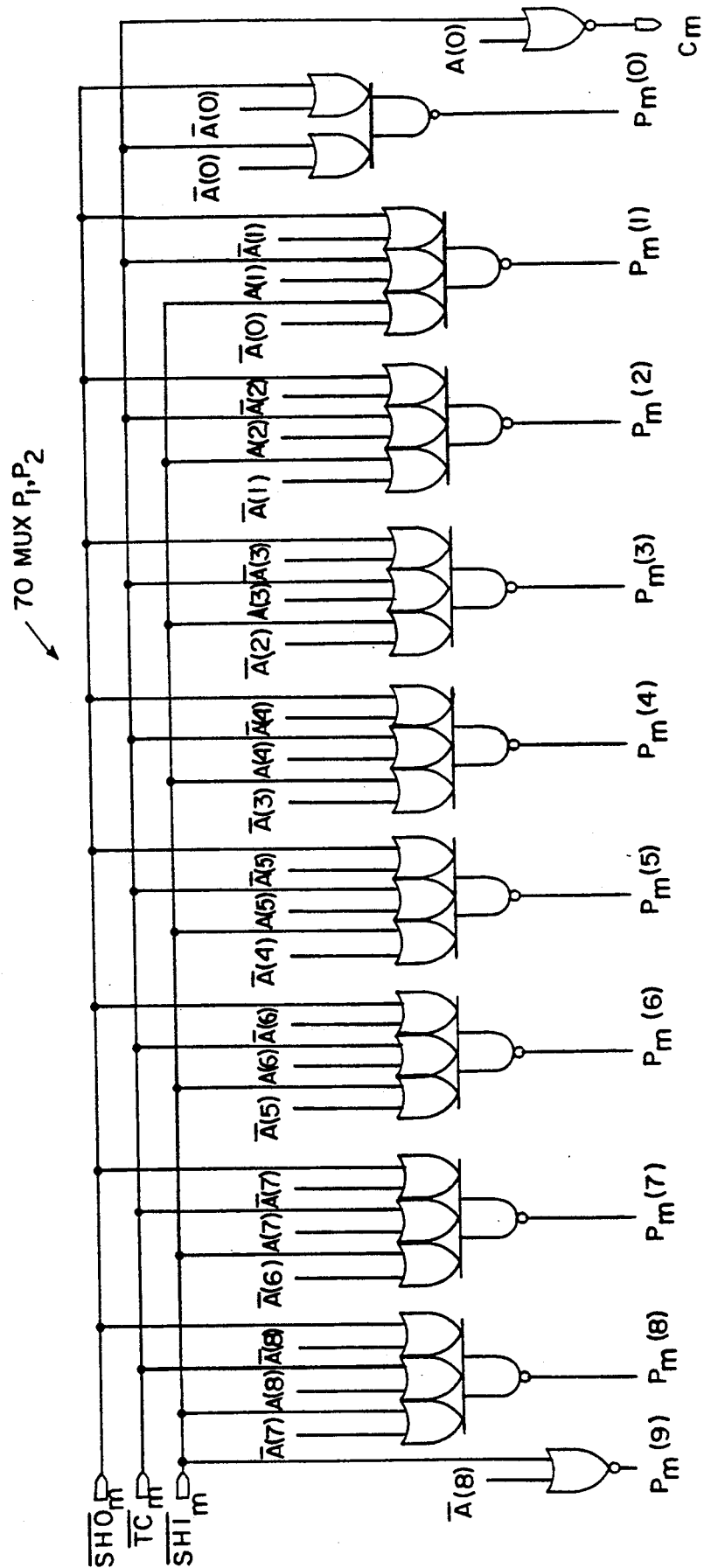
FIG. 4 is other multiplexers for partial products $P_1$ $P_2$ according to the principles of the present invention.
Figure 5:
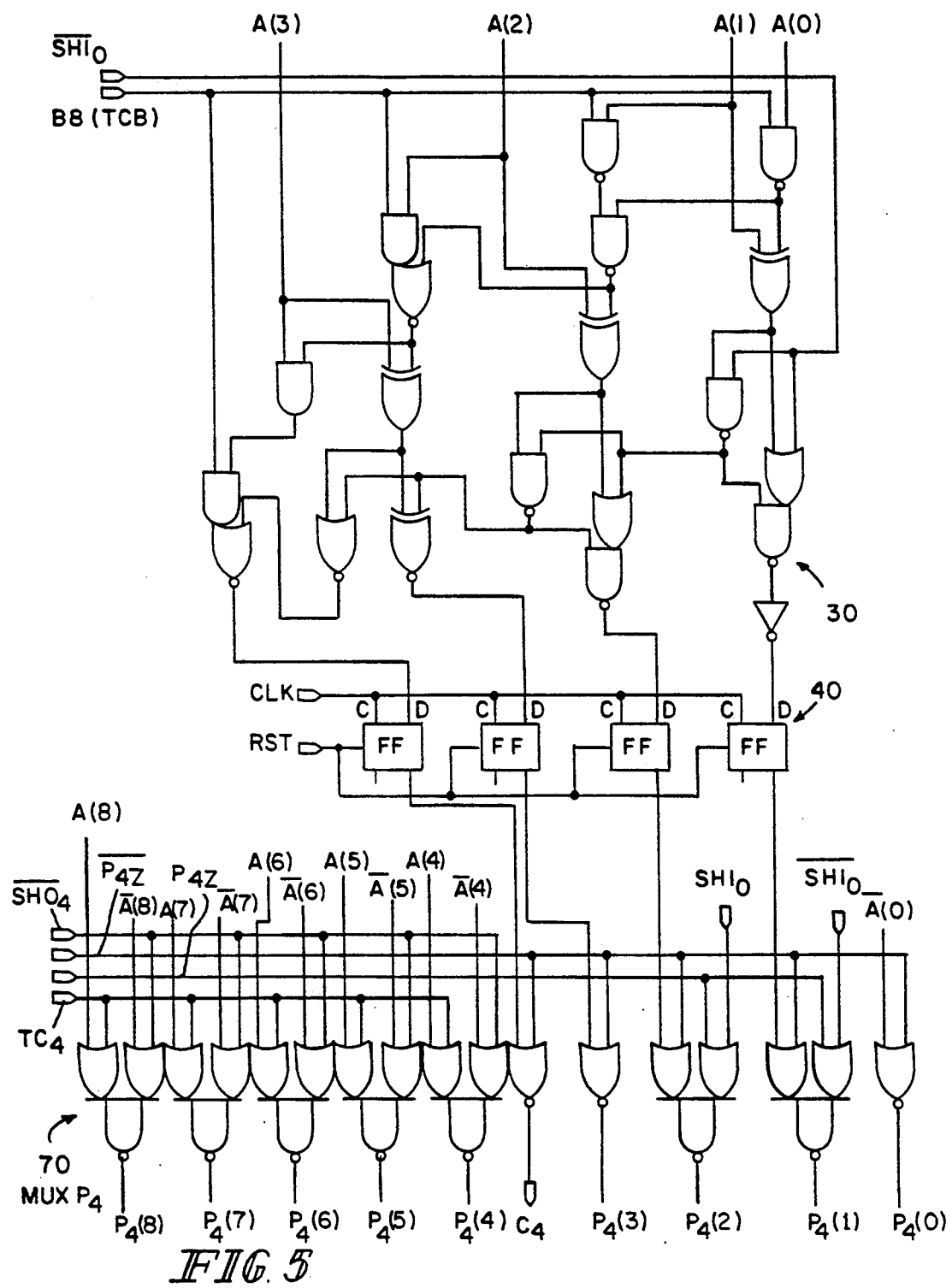
FIG. 5 is a logic diagram of an extra product $P_4$ multiplexer including a pre-adder according the principles of the present invention.

The logic or schematic for the multiplexer for the first partial product $P_0$, for the other partial products $P_1$, $P_2$, and for the extra partial product $P_4$ are illustrated in FIGS. 3, 4 and 5 respectively. The input to the multiplexer for $P_0$, $P_1$, $P_2$ in FIG. 3 and 4 includes A and $\overline{A}$ from the multiplicand register 20 and control bits $\overline{SH0}$, $\overline{TC}$ and $\overline{SH1}$ from the recoded multiplier register 60. Each of the output logic gates for the second through ninth partial product bits includes three inputs from the $\overline{A}_n$, $A_n$ and $A_{n-1}$ as compared to only two bits $A_n$ and $\overline{A}_n$ in the extra multiplexer for $P_4$ of FIG. 5. In the extra multiplexer of FIG. 5, the partial product is either the positive or negative value, whereas in the multiplexer of FIGS. 3 and 4, the multiplier may be plus and minus one as well as two and therefore requiring a shift.

It should also be noted that the multiplexer $P_1$ and $P_2$ of FIG. 4 includes a tenth output bit $P_9$ for a 9×9 multiplier of Table 20. The tenth bit $2^9$ of the first partial

TABLE 22

| $2^{15}$ | $2^{14}$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|---|---|---|---|---|
| S | S | S | S | S | S | S | S/$P_0$ | $P_0$ | $P_0$ | $P_0$ | $P_0$ | $P_0$ | $P_0$ | $P_0$ | $P_0$ |
|   |   |   |   | $C_4$ | $P_1$ | $P_1$ | $P_1$ | $P_1$ | $P_1$ | $P_1$ | $P_1$ | $P_1$ | $P_1$ | $C_0$ |   |
|   |   |   | $P_2$ | $P_2$ | $P_2$ | $P_2$ | $P_2$ | $P_2$ | $P_2$ | $P_2$ | $P_2$ | $P_2$ | $C_1$ |   |   |
|   | $P_3$ | $P_3$ | $P_3$ | $P_3$ | $P_3$ | $P_3$ | $P_3$ | $P_3$ | $P_3$ | $C_2$ |   |   |   |   |   |
| $P_4$ | $P_4$ | $P_4$ | $P_4$ | $P_4$ | $P_4$ | $P_4$ | $P_4$ | $C_3$ |   |   |   |   |   |   |   |

TWO BIT RECODING IMPLEMENTATION

The logic implementation will be that of the coding of Tables 7 and 10 and equations [1] and [2], the sign extension word SEW of Table 16 and equation [8], two's complementation of Table 18 and equation's [9] and [13], a multiplexer array of Table 20, and a pre-adder of Table 21.

Figure 2:
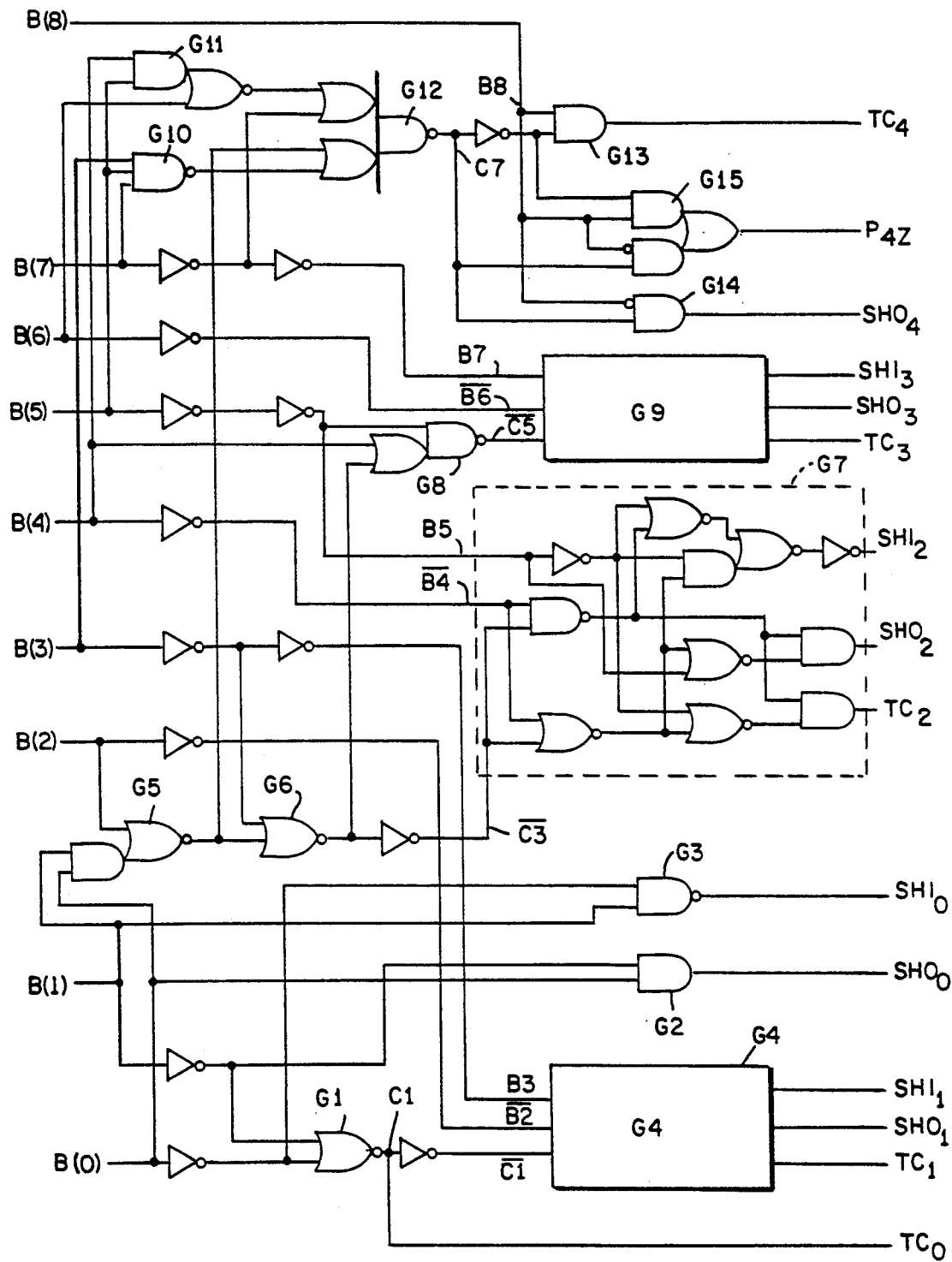
FIG. 2 is a logic diagram of a recoder according to principles of the present invention.

An example of the recoder 50 implementing the recoding of Table 7 and equations [1] and [2] is illustrated in FIG. 2. A nine-bit two's complement multiplier B0–B8 is provided as an input to the recoder 50. Gate G1 produces the Carry C0 of the first bit-pair which is also equal to $TC_0$ as described by equations [1c] and [1d] respectively. Gates G2 and G3 produce the shift $SH0_0$ and $SH1_0$ respectively thereby implementing equations [1a] and [1b] respectively.

Gate 4 receives as input signals $\overline{C1}$ $\overline{B2}$, B3 and produces the output signals $TC_1$ $SHO_1$ and $SH1_1$. Gate G5 produces not only the first Carry, but in combination with G6 it produces a Carry C2 of the second bit-pair and provides it as an input through an inverter to Gate G7. The other inputs to Gate G7 are $\overline{B4}$ and B5 which produces the outputs $TC_2$, $SH0_2$ and $SH1_2$. The Gate G8 receives the output of G6 or the Carry C3 and produces the Carry $\overline{C5}$ as an input to Gate G9 whose other inputs are $\overline{B6}$ and B7. G9 provides the output $TC_3$ $SH0_3$ and $SH1_3$. Gates G4, G7, and G9 are identical and only the details of G7 are shown implementing the equations [2a], [2b] and [2d].

Gates G10, G11 and G12 provide an output Carry C7 which is converted in combination with B8 by Gates G13 and G14 to $TC_4$ and $SH0_4$ for the extra or Carryout partial product $P_4$. Gate G15 has inputs C7, $\overline{C7}$ and B8 and produces an output signal $P_{4Z}$ which indicates that the partial produce $P_4$ is not required or is zero, and thus product $P_0$ in Table 20 shares an array bit location with the first bit of the sign extension word SEW, even though only one will be present at any one time. Thus the tenth bit of the first partial product $P_0$ is accounted for in the sign extension word multiplier of FIG. 6 as will be discussed below.

A review of Table 20 and 22 indicates that the complementing Carry, other than for the extra partial product is always located in the second bit position with respect to the respective partial product. The multiplexers implement the recoding of Table 7 has only one negative partial product for the recoded −1. Using the complementation illustrated for −1 of Table 18, the first bit is a A0 with the remainder of the bits complemented and the complementing Carry C0 at the second bit position is $\overline{A0}$. In FIG. 3 and 4, the first gate to the right is under the control of the $\overline{TC}$, and produces $\overline{A0}$ for the complementing Carry C. The second from the right logic gate produces A0 for the two's complement as well as the shift for SH1, whereas the other gates produces one of the appropriate inputs the signals A as the output under the controls of $\overline{TC}$, $\overline{SH0}$, $\overline{SH1}$.

The schematic of the pre-adder 30 in combination with the pre-adder register 40 and the multiplexer for the extra or most significant partial product $P_4$ illustrated in FIG. 5. The input to the pre-adder 30 includes the complement of the shift one signal for the first partial product $\overline{SH1}_0$ and the sign or eight-bit of the multiplier B8 (TCB) as well as the first four bits directly from the input port 12 instead from the multiplicand register 20. The logic of the pre-adder 30 is defined in Table 21 and provides the second, third and fourth bits with pre-added complementing Carryins to the pre-adder register 40 which has a clock and reset input. The output of the pre-adder 40 is provided by the pre-adder register to the extra product multiplier. The other inputs of the extra product multiplexer are the value and the one's complement of the value stored in the multiplicand register 20 and signify it as A and $\overline{A}$. The controls for the extra product multiplexer include control signals $P_{4Z}$, and $\overline{P}_{4Z}$, $SH0_4$, and $TC4$ from the recoder 50. Additionally the second and third logic bit position also received the shift 1 signal and its inverse $SH1_0$ and $\overline{SH1}_0$ of the first partial product also from the recoder 50.

The first stage of gates of pre-adder 30 connected to the sign bit B8 of the multiplier passes the first four bits of multiplicand A unaltered for a positive two's complement multiplier (B8=0) or passes 1 plus the one's complement of the first four bits of multiplicand A for a negative two's complement multiplier (B8=1). The second stage of gates of pre-adder 30 connected to the output of the first stage gates and to the shift one signal $\overline{SH1}_0$ adds 4 to the results of the first stage if the recoded multiplier for the first partial product is $B_1 B_0 = 10$ or two and adds 2 if the recoded multiplier for the first partial product is 1, −1 or 0. Thus the first stage accounts for the product complementing carry while the second stage accounts for the shifting of the complementing carry for the sign extension word SEW.

Figure 6:
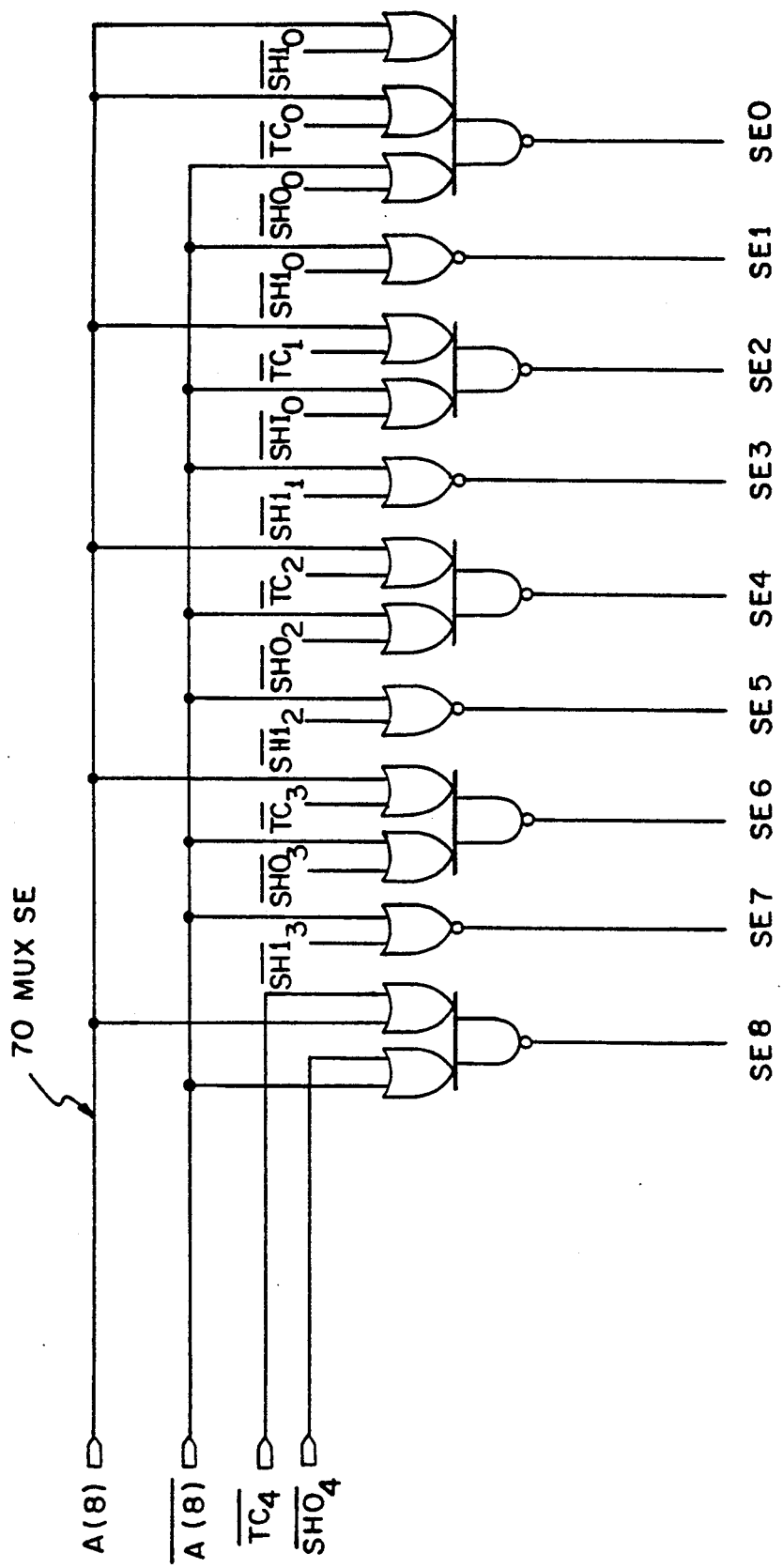
FIG. 6 is a logic diagram of a sign extension multiplexer according to the principles of the present invention.

The multiplexer array 70 of FIG. 1 includes a TC4 sign extension multiplexer illustrated in FIG. 6. The ninth bit A8 of the multiplicand is the two's complement sign bit and is used with control signals $\overline{TC}$, $\overline{SH0}$ and $\overline{SH1}$ from multiplier register 60 to produce the appropriate 1's complement of the bit-pairs SE0 through SE8. With the addition of a sign extension complementary Carry in the pre-adder 30 the one's complement of SE0 through SE8 is converted to the sign extension word SEW as a two's complement of SE0 through SE8.

As discussed, circuit implementations of FIGS. 2 through 6 are for a 9 bit by 9 bit two's complement multiplier and multiplicand using the Table 20. Since the tenth-bit may either be the ninth bit of a first product for a multiplier of 2 or it may be the beginning of the sign extension word, the tenth-bit for the multiplexer of the first partial product of FIG. 3 does not include the tenth-bit position as compared to the multiplexer of FIG. 4. This tenth-bit is formed in the first-bit location of the sign extension word multiplexer of FIG. 6. You'll note that the first gate includes six instead of four inputs so as to produce either the most significant bit of the first partial product P0 or first-bit or the least significant bit of the sign extension word SEW before the complementing Carry which is accounted for in the pre-adder 30.

SIGN-MAGNITUDE REPRESENTATION

In sign-magnitude format, the most significant bit MSB of an operand indicates it's sign, and the remaining bits represent its absolute value or magnitude. In the instances where either one or both operands are represented using sign-magnitude format, the algorithm described above requires minor modifications. Such modifications will depend on which of the operands is in sign-magnitude format, and whether the result of the multiplication is to be represented in sign-magnitude format or two's complement format.

If the result of multiplication is to be in sign-magnitude format, the sign bits of both operands are separated from the magnitudes of the operands and are used to determine the sign bit of the product. The sign bit of the result is negative if the sign bits are of opposite values, otherwise the sign bit is positive using the law of signs. The sign bit of the result is an Exclusive OR of the sign bits of both operands. The multiplication of the magnitudes is performed identically to that for unsigned integers and the result sign bit is then concatenated with the final product. One consequence of sign-magnitude representation is that a number with zero magnitude may have either a positive or negative sign, a feature inherent to sign magnitude representation.

If a multiplication of a sign-magnitude multiplicand by a two's complement multiplier is to be performed, modification is only required in the case of a negative multiplicand. In this instance the value of the multiplicand has to be converted to a negative two's complement format before it is used for generation of partial products.

Two's complementation of the multiplicand is accomplished in a two-step process. In the first step the one's complement (inversion) of the multiplicand is loaded to the multiplicand register 20. Referring to Table 19 previously discussed, the complementing Carry C required to convert one's complement format to two's complement format is then inserted into the second least significant bit LSB locations of partial products whenever no shift (SH0) or the least significant bit LSB whenever a single shift (SH1) is performed. No complementing carry C is inserted if the multiplier generates a zero, or a negative (TC) partial product is generated. The generation of a negative partial product is equivalent to double negation of the multiplicand, and therefore results in the original positive magnitude of the multiplicand. Thus the complementing carries C are inserted in the same locations as the complementing carry added during the negation of two's complement multiplicands (all TC cases). The carry can occupy the same location in the array because they are generated by the above mutually exclusive conditions. Whenever pre-addition is performed, the complementing of A is determined by the Exclusive-OR of the fact that A is a negative number and the fact that sign B is positive. The sum and carry out of the pre-addition are thus always correct. Comparing Table 18 and 19, the only difference that results is that the logic for adding a complementing carry is inverted.

A negative multiplier represented in sign-magnitude format is one's complemented prior to its recoding. The complementing Carry C necessary to convert it to a full two's complement format is then entered into the least significant two-bit recoded cell in a manner similar to that used in the higher order two-bit recoded cells.

The decision to store the one's complement in the multiplicand register is a function of the formats of the inputted multiplicand A and multiplier B and the required format of the output product P. An analysis of the various permutation and combination of these formats and the signs can be reduced to a store one's complement decision SC as follows:

$$SC = (S + U)_p[(T^-)_A \oplus (T^-)_B] + T_p[(S^-)_A \oplus (S^-)_B] \qquad [14]$$

Wherein
T is two's complement format
U is unsigned format
S is sign magnitude format
subscript p is product format
subscript A is multiplicand format
subscript B is multiplier format superscript + is positive number
superscript − is negative number Thus by providing the appropriate formatting inputs, the multiplier can handle any combination of inputs and outputs formats and not be dedicated to a fixed or predetermined combination.

COMPLEX MULTIPLICATION

The ability to perform on-the-fly negation of the multiplicand as illustrated in Table 19 also allows a more efficient hardware implementation of a multiplier designed to perform the multiplication of two complex numbers of the form:

$$P=(A+jB)\times(C+jD)$$

resulting in two products:

$$R = AC - BD \quad I = j(AD + BC)$$
$$\text{(real)} \quad \text{(imaginary)}$$

Figure 7:
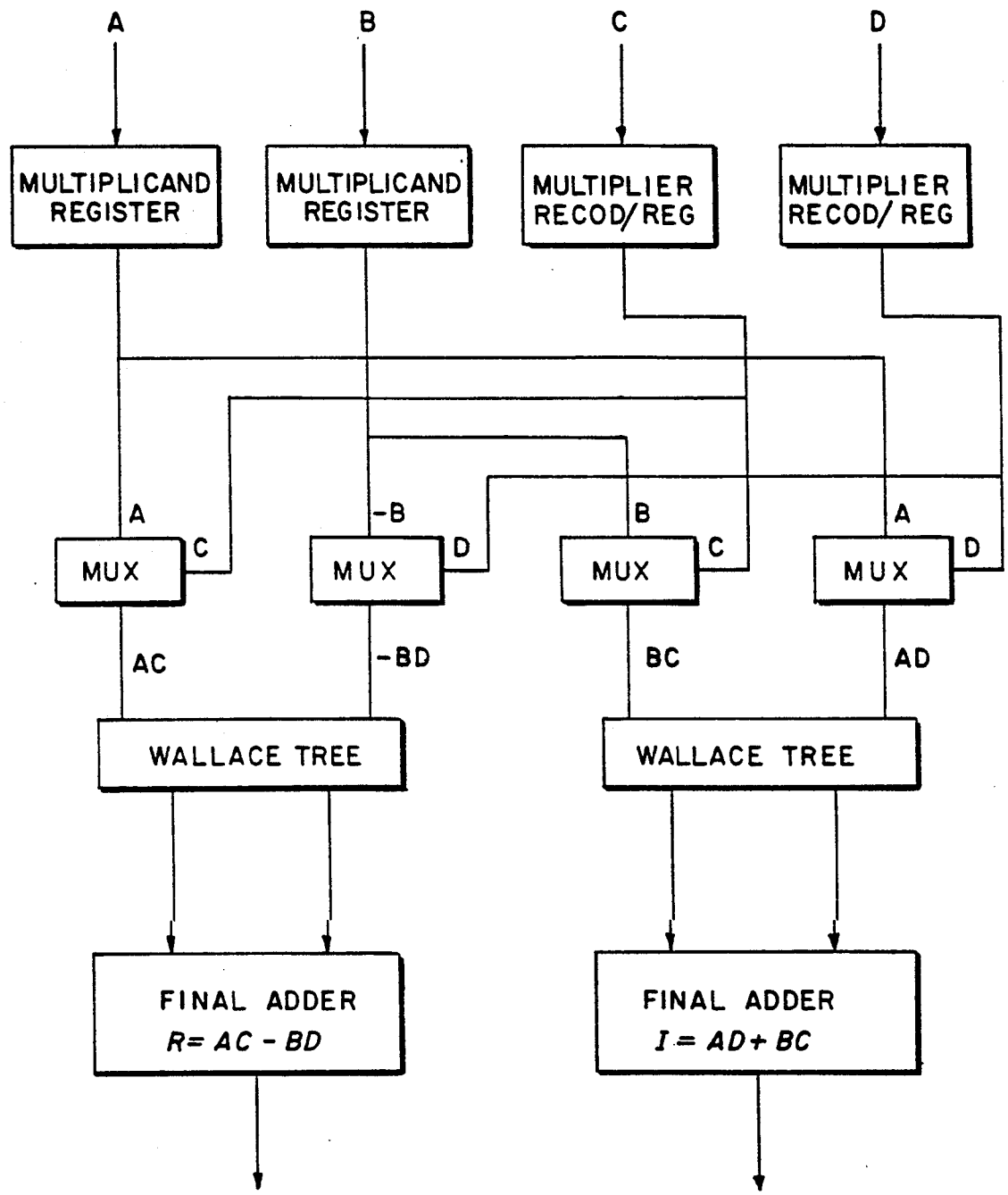
FIG. 7 is a block diagram illustrating a complex multiplier according to the principles of the present invention.

Performing on-the-fly negation of the multiplicand B, allows the subtraction of the product BD to be performed in the Wallace tree adder array as shown in FIG. 7. If the complex multipliers perform pre-addition in four parallel pre-adders to reduce the number of stages in the adder array, one pre-adder is required for each of the four composite products: AC, −BD, AD and BC.

The two multiplicand registers A and B and the two multiplier recoder registers C and D are connected respectively to at least two multiplexers. The first multiplexer receives the multiplicand A and the recoded multiplex control signals from multiplier register C. The second multiplexer receives the −B multiplicand from the $\overline{Q}$ side of the multiplicand register B and the multiplexer controls from multiplier register D. The third multiplexer receives the output of the multiplicand register B and the multiplexer control bits from multiplier register C. The fourth multiplexer receives the multiplicand from multiplicand register A and the multiplexer control bits from multiplier D. The output of the first pairs of multiplexers are combined in a single Wallace Tree whose output is provided to a single final adder to produce the real component R=AC−BD of the complex multiplication. The third and fourth multiplexers provide input to a single Wallace Tree whose outputs are added in a final adder to provide the imaginary output I=AD+BC.

The prior art complex multiplier would require four multipliers to compute AC, BD, AD and BC. Then a substractor would form the real portion AC−BD and an adder would form the imaginery portion AD+BC. Each multiplier would include a multiplicand and a multiplier registers and a final adder, for a total of eight registers, five final adders and one substractor. The present approach saves four registers, three final adders and a substractor. Also the prior art required four Wallace tree adder array which in the present design are combined into two, one for the real and one for the imaginary portions. Although two additional carry-save-add levels are needed by the new approach, the delay they add is significantly less than the delay of the final adder they replace. Thus the new approach saves both time and hardware.

MULTIPLIER/ACCUMULATOR

Multiplier/Accumulator is a multiplier having an accumulator at the output. The value of the accumulator is added/substracted into/from the output of the multiplier. Since the accumulator has a greater width than the multiplier, the sign of the multiplier must be extended for proper addition/substraction. Since the width of the output of the multiplier is the sum of the bits of the multiplicand and the multiplier, the sign of the product may be extended by extending the sign of the multiplier or the multiplicand or both.

Extending the sign of the product requires first completing the product and then extending its sign. This causes additional delays, and thus is not a preferred method. Extending the sign of the multiplicand requires extending the width of each partial product requiring additional hardware in the adder array. Extending the sign of the multiplier would appear to extend the number of partial products. But using the following described method, the product sign extension word PSEW can be developed in logic and provided to the final adder in parallel with the Wallace Tree or adder array operation.

As will be noted from the following, the sign extension of the multiplier is a product sign extension word of all ones except for the least significant bit which may be a 0 or a 1 depending upon the sign of the multiplicand A and the sign of the most significant partial product generated by the multiplier B.

Where the multiplier B is an unsigned number, extending it with zeros produces no additional partial products in the recoding scheme. The sign extension SE of these additional partial products would be all zeros and therefore when complemented into a sign extension word produce all ones. Since the additional partial product produced by Carryout of the most significant bit-pair of an even width multiplier or by Carryout of the most significant bit of an odd width multiplier extended to the end of the range of the multiplier, no sign extension was generated for the extra or most significant partial product. With the sign extension of the multiplier, the sign extension of this extra partial product must be taken into account. If the multiplicand is positive, the unsigned multiplicand B will always produce a positive partial product and therefore its sign extension would be the zero. Thus the least significant bit of the product sign extension word PSEW would be a one. If A is negative and a extra product is produced, the sign extension SE would be a one and when it is complemented it will become a zero thus the least significant bit of the product sign extension PSEW would be a zero.

For positive two complement numbers, the multiplier would be extend with all zeros which will produce the product sign extension PSEW of all ones. Since the most significant bit of the positive two's complement numbers is zero, the coding of the most significant bit does not produce a Carry or extra partial product and therefore the least significant bit of the product sign extension word PSEW is a one.

For negative two's complement numbers, the multiplier B is extended with all one's. If the most significant bit pair of an even width multiplier B is 1 1 and there is a Carryin, this recodes to a zero with a Carryout. The Carryout causes the extended ones to become zeros which produce no partial products, a sign extension of zero and a product sign extension word PSEW of all ones. If the most significant bit pair is a 1 1 with no Carryin or a 1 0 with a Carryin, they are both recoded as a −1 and a Carryout. The Carryout causes the extended ones to become zeros, produce sign extensions SE of zeros, and a product sign extension word PSEW of all ones.

If the most significant bit-pair of the even width, negative two's complement number is a 1 0 with no Carryin, this is recoded as a multiplication by 2. The next pair of one's of the extended sign are recoded as a −1 plus a Carryout. The −1 causes the extra partial product to be produced. If the multiplicand A is negative, the sign extension SE of the additional partial product would be 0 0 and would invert to the product sign extension word PSEW of all ones. If the multiplicand A is positive, then the sign extension SE caused by the extra partial product would be 0 1. This would be inverted to a 1 0 producing a zero in the least significant bit of the product sign extension PSEW. As discussed, previously, the Carry generated from the −1 causes the remaining sign extensions of the multiplier to become zeros which would not effect the remaining ones of the product sign extension word PSEW.

Where the multiplier B is a negative two's complement number of an odd number of bits, the most significant bit is a one and the most significant bit pair, with a one from the sign extension, would be a 1 1. This would recode to −1 plus a Carryout. The sign of the partial product generated by −1 would be in the most significant bit position of the SEW. The Carryout would cause the remaining extending ones in the multiplicand to become zeros, thus generating no additional partial products. Thus PSEW is all ones.

To summarize, if the multiplier B is an even or odd unsigned number and it produces a extra product and the multiplicand A is negative, then the least significant bit of the sign extension is zero. Also if the multiplicand B is an even bit negative two's complement number having a most significant bit pair of 10 with no Carryin, to be recoded as a two and an additional partial product of −1 is generated, and the multiplicand A is positive, then the least significant bit of the product sign extension PSEW will be zero. In all other situations, the product sign extension word PSEW would be all ones including the least significant bit.

IMPLEMENTATION OF A MULTIPLIER/ACCUMULATOR

Figure 8:
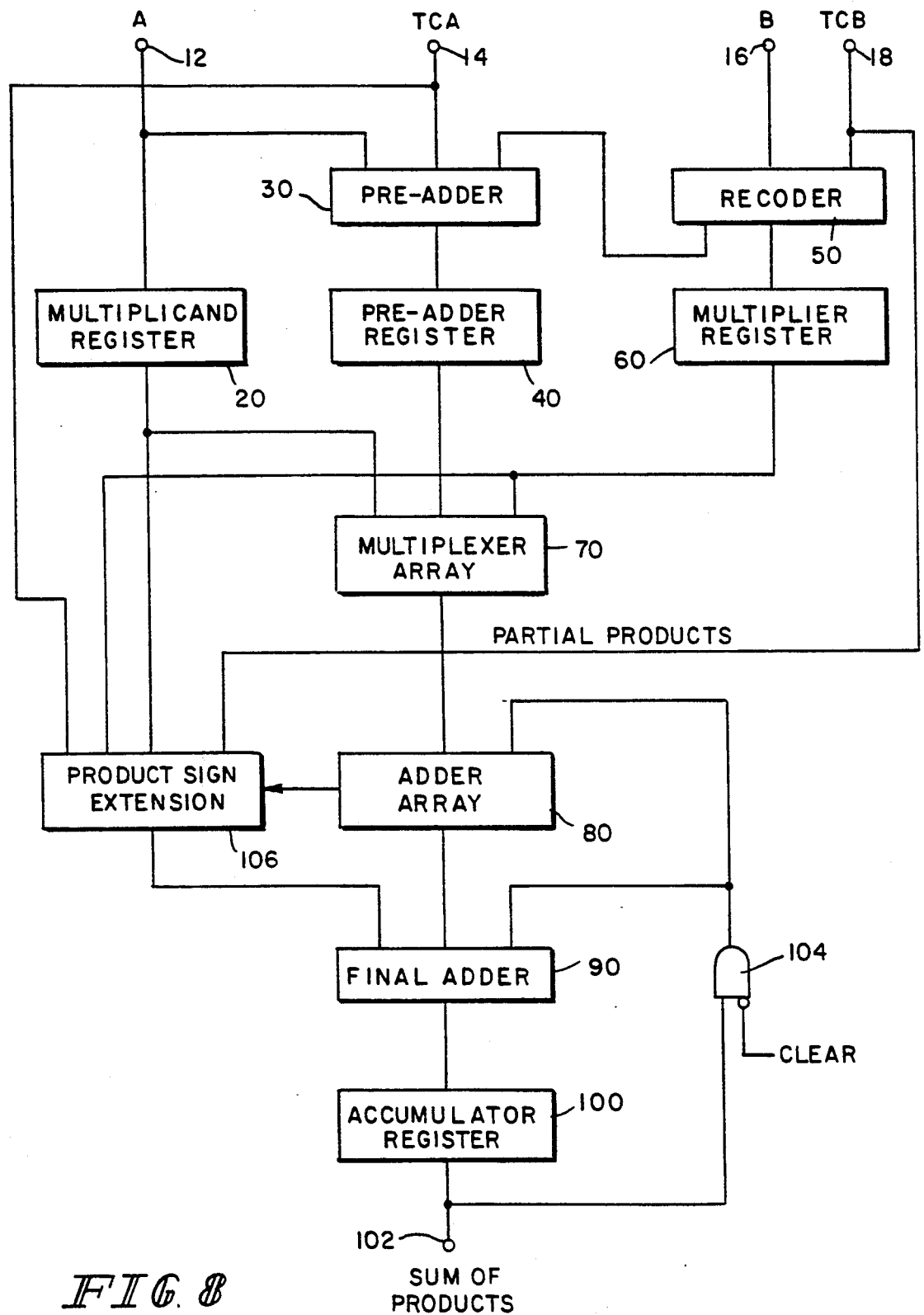
FIG. 8 is a block diagram of a multiplier/accumulator according to the principles of the present invention.

A multiplier/accumulator is illustrated in FIG. 8, wherein the elements having the same operation and function as in FIG. 1 include the same numbers. In addition to the multiplicand register 20, the pre-adder 30, the pre-adder register 40, the recoder 50, the multiplier register 60, multiplexer array 70, adder array 80 and final adder 90, the multiplier/accumulator includes an accumulator register 100 at the output of the final adder 90 and whose output is connected to the sum of products 102. The adder array 80 produces a Q bit product, where Q=M+N and the accumulator register 100 has a capacity of R, which is greater than Q. The least significant Q bits of the output of the accumulator 100 is also fed back through gate 104 to the adder array 80 and the final adder 90. Also included is the product sign extension multiplexer 106 which receives inputs TCA from the multiplicand format control 14, TCB from the multiplier format control 18, the out of range Carry from the adder array 80, the multiplexer controls for the most significant bit pair from the multiplier register 60, and the most significant bit $A_{N-1}$ of the multiplicand from the multiplicand register 20. The product sign extension multiplexer 106 determines the value of the least significant bit of the product sign extension PSEW.

Figure 8A:
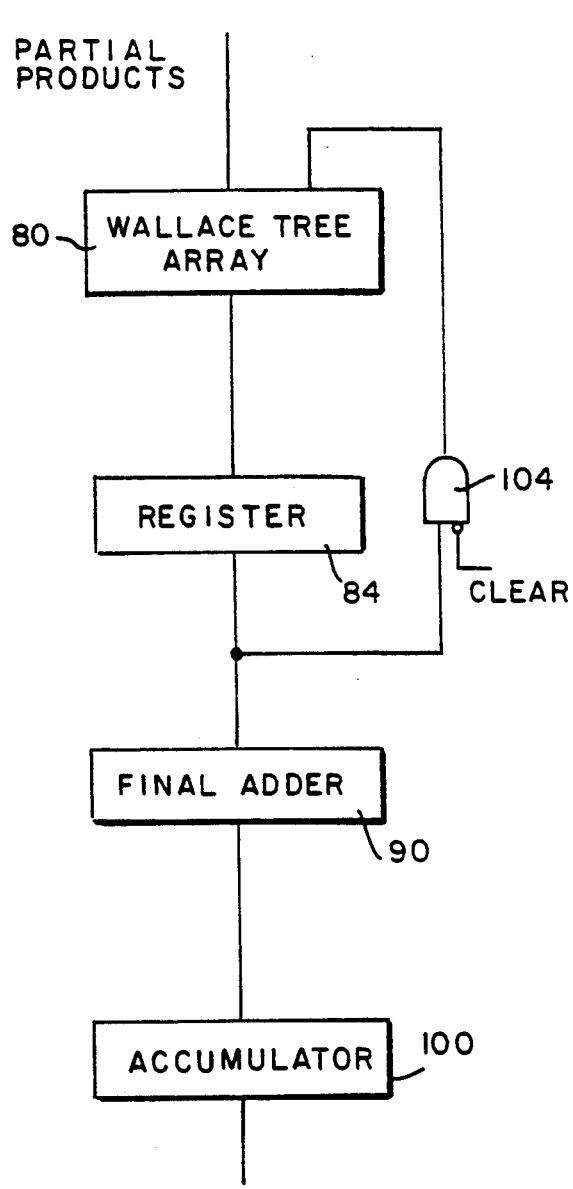
FIGS. 8a and 8b are modification of the accumulator portion of FIG. 8 using piplining according to the principles the present invention.
Figure 8B:
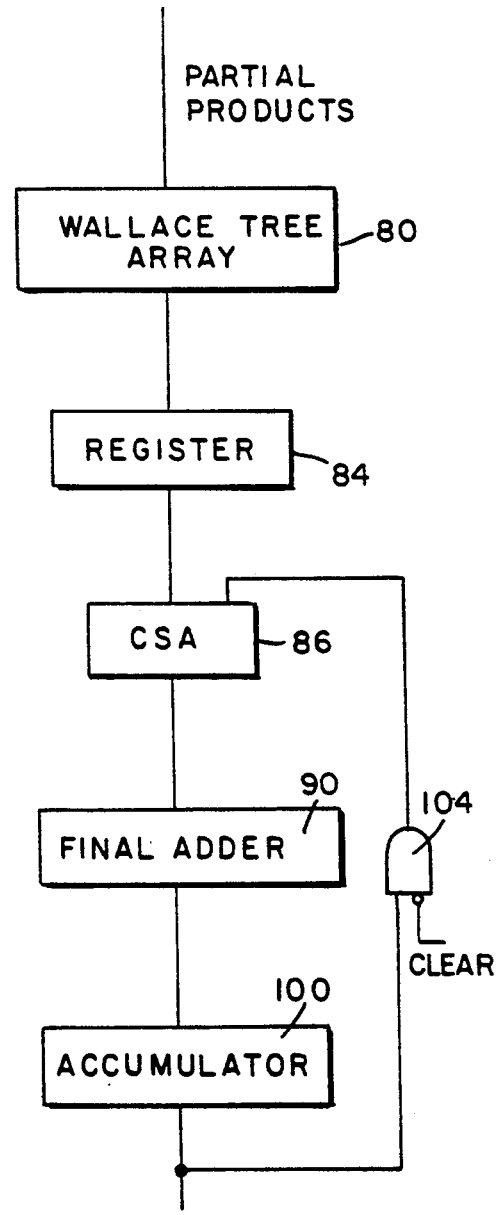

FIGS. 8a and 8b illustrate two pipeline modifications of the multiplier/accumulator of FIG. 8. In FIG. 8a, a register 84, which is between the adder array 80 and the final adder 90, has its output fed back to the adder array 80 by gate 104. In FIG. 8b, a Carry-save-adder 86, which is between the register 84 and final adder 90, combines the output of register 84 with the output of accumulator 100 fed back by gate 104.

Table 23 illustrates the various inputs to the final adder 90.

TABLE 23

|  |  |  | $S_{Q-1}$ | $S_{Q-2} \ldots S_1$ $S_0$ | Sum |
|---|---|---|---|---|---|
|  |  | $C_{Q-1}$ | $C_{Q-2}$ | $C_{Q-3} \ldots$ $C_0$ | Carry |
| $X_{R-1}$ | $X_{R-2} \ldots$ $X_{Q+1}$ | $X_Q$ |  |  | MSB |
| 1 | 1 ... 1 | PSEW |  |  |  |

The adder array 80 provides a sum output S and a Carry output C. The most significant bits X from the accumulator register 100 are provided as is the product sum extension word PSEW from sign extension multiplexer 106. The ability to use a single final adder 90, requires that only two bits per bit position be provided.

If the least significant bit of the product sign extension word PSEW is a zero, there is no competition for the Nth position. The all ones product sign extension, dropping the zero, can be merged with the Carry C from the adder array while the most significant bits X from the accumulator can be merged with the sum from the array. This will provide two merged words to the final adder.

If the least significant bit of the product sign extension PSEW is a one, then there are three bits which must be added in the Nth bit position.

Using equations [10] and [11] which indicates that adding 1 to a bit produces the complement of the bit plus a Carry and that the Carry is the original bit. Thus if the one's from the product sign extension are pre-added to the most significant bits X from the accumulation register 100, they would produce two words being represented as the sum of the all one's PSEW plus the accumulator value X as the sum which is the inverse $\overline{X}$ of the accumulation value plus a Carry of the accumulator bit X.

TABLE 24

| $\overline{X}_{R-1}$ | $\overline{X}_{R-2} \ldots \overline{X}_{Q+1}$ | $\overline{X}_Q$ | $S_{Q-1}$ | $S_{Q-2} \ldots S_1$ $S_0$ |
|---|---|---|---|---|
| $X_{R-2}$ | $X_{R-3} \ldots X_Q$ | $C_{Q-1}$ | $C_{Q-2}$ | $C_{Q-3} \ldots$ $C_0$  0 |

As illustrated in Table 24, the one's complement or inverted accumulator bits X are merged with the sums from the array while the Carry, which is the most significant bits X from the accumulator register, are the equivalent of the most significant bits X shifted one place left and merged with the Carry's C from the adder array. Thus in effect, the product sum extension PSEW, which is provided to the final adder 90, may be considered the one's complement $\overline{X}$ of the most significant bits of the accumulator register and the most significant bits X being also shifted one bit left is the other input to be merged. Alternatively, the product sign extension PSEW maybe considered the most significant bits $\overline{X}$ from the accumulator register or the non true outputs provided to final $\overline{X}$ the adder.

An alternative method of resolving the conflict at the Qth bit is to add the last Carry $C_{Q-1}$ to the product sign extension word PSEW again using equations [10] and [11]. The addition of $C_{Q-1}$ with 1 produces $\overline{C_{Q-1}}$ with a Carry of $C_{Q-1}$. This Carry is then added to the next one, inverting it and producing a Carry all the way down the line. Thus is illustrated in Table 25.

TABLE 25

| $\overline{C}_{Q-1}$ | $\overline{C}_{Q-1}$ | $\overline{C}_{Q-1}$ | $\overline{C}_{Q-1}$ | $S_{Q-1}$ | $S_{Q-2} \ldots S_1$ | $S_0$ |
|---|---|---|---|---|---|---|
| $X_{R-1}$ | $X_{R-2} \ldots$ | $X_{Q+1}$ | $X_Q$ | $C_{Q-2}$ | $C_{Q-3} \ldots$ | |
| | | | | | $C_0$ | |

The pre-addition of the product sign extension word PSEW and the most significant Carry $C_{Q-1}$ produces a sign extension word of $\overline{C_{Q-1}}$. This is merged with the sums from the adder array as one of the inputs of the final adder while the remaining Carry's C are merged with the most significant bits from the accumulator register as a second input to the array. Thus the product sign extension word PSEW may be considered a string of the one's complement of the most significant Carry $C_{Q-1}$.

The choice of which form of merging in Table 24 and 25 to be used as the input of the final adder 90 is determined by the loading on the $C_{Q-1}$ output. If the fan-out requires extensive buffering, then the first form of Table 24 is preferred.

FOUR-BIT RECODING

One of the advantages that a modified Booth operator has over the recoding of Tables 7 and 14 is that the Booth operator is setup such that it can examine a preceeding bit to determine its recoded value and is not effected by any ripple effect. In the recoding Tables 7 and 14 one cannot examine the $b_{m+1}$ bit to determine whether a Carry will be produced. In Table 7 for the bit-pair value for $B_{m+1}$, $B_m = 1\ 0$, the Carryout $C_{m+1}$ will only be produced if there is a Carryin $C_{m-1}$. Similarly in Table 14, for bit-pair of $B_{m+1}$, $B_m = 0\ 1$, Carryout $C_{m+1}$ will only be produced if a Carryin $C_{m-1}$ is received.

As an extension of the two-bit recoding schemes previously described, a four-bit encoding will be described which reduces the amount of hardware and logic, reduces the delay and makes the Carryout insensitive to the Carryin and therefore makes the recoding a rippleless recoding scheme.

TABLE 26

| Multiplier Value w/o Carryin | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| x mux | 0 | 0 | −4 | −4 | −4 | −4 | 8 | 8 | 8 | 8 | 4 | 4 | 4 | 4 | 0 | 0 |
| y mux ($C_{m-1}=0$) | −1 | −2 | 1 | 0 | −1 | −2 | 1 | 0 | −1 | −2 | 1 | 0 | −1 | −2 | 1 | 0 |
| y Mux ($C_{m-1}=1$) | 0 | −1 | 2 | 1 | 0 | −1 | 2 | 1 | 0 | −1 | 2 | 1 | 0 | −1 | 2 | 1 |
| Carryout ($C_{m+3}$) | 16 | 16 | 16 | 16 | 16 | 16 | 0 | 0 | 0 | 0 | 0 | 0 | 0 | 0 | 0 | 0 |

As illustrated in Table 26, two multiplexers are used with the X multiplexer being for the two higher order bits and the Y multiplexer being for the two lower order bits. The Y multiplexer uses a recoding scheme which is that of Table 10 in a repeating pattern using five multipliers including 0, +1, −1 +2, −2. The X multiplexer, which does not receive any Carryin $C_{m-1}$ is also a sequence or pattern similar to that to Table 5 since the X multiplexer does not have a Carryin. The multiplier value in Table 26 is without or before Carryin. The Carryout is a function of this multiplier valve and is not affected by the Carryin.

The relationship between the four-bits of binary codes and the Carryin $C_{m-1}$ to produce the multiplexer controls and Carryout $C_{m+3}$ is illustrated in Table 27.

TABLE 27

| Multiplier | | | | Mux | | | | Mux | | | |
|---|---|---|---|---|---|---|---|---|---|---|---|
| $B_{m+3}$ | $B_{m+2}$ | $B_{m+1}$ | $B_m$ | $C_{m-1}$ | $X_m$ | $Y_m$ | $C_{m+3}$ | $C_{m-1}$ | $X_m$ | $Y_m$ | $C_{m+3}$ |
| 0 | 0 | 0 | 0 | 0 | 0 | 0 | 0 | 1 | 0 | 1 | 0 |
| 0 | 0 | 0 | 1 | 0 | 0 | 1 | 0 | 1 | 0 | 2 | 0 |
| 0 | 0 | 1 | 0 | 0 | 4 | −2 | 0 | 1 | 4 | −1 | 0 |
| 0 | 0 | 1 | 1 | 0 | 4 | −1 | 0 | 1 | 4 | 0 | 0 |
| 0 | 1 | 0 | 0 | 0 | 4 | 0 | 0 | 1 | 4 | 1 | 0 |
| 0 | 1 | 0 | 1 | 0 | 4 | 1 | 0 | 1 | 4 | 2 | 0 |
| 0 | 1 | 1 | 0 | 0 | 8 | −2 | 0 | 1 | 8 | −1 | 0 |
| 0 | 1 | 1 | 1 | 0 | 8 | −1 | 0 | 1 | 8 | 0 | 0 |
| 1 | 0 | 0 | 0 | 0 | 8 | 0 | 0 | 1 | 8 | 1 | 0 |
| 1 | 0 | 0 | 1 | 0 | 8 | 1 | 0 | 1 | 8 | 2 | 0 |
| 1 | 0 | 1 | 0 | 0 | −4 | −2 | 1 | 1 | −4 | −1 | 1 |
| 1 | 0 | 1 | 1 | 0 | −4 | −1 | 1 | 1 | −4 | 0 | 1 |
| 1 | 1 | 0 | 0 | 0 | −4 | 0 | 1 | 1 | −4 | 1 | 1 |
| 1 | 1 | 0 | 1 | 0 | −4 | 1 | 1 | 1 | −4 | 2 | 1 |
| 1 | 1 | 1 | 0 | 0 | 0 | −2 | 1 | 1 | 0 | −1 | 1 |
| 1 | 1 | 1 | 1 | 0 | 0 | −1 | 1 | 1 | 0 | 0 | 1 |

The Carryout $C_{m+3}$ is a function of bits $B_{m+1}$ $B_{m+2}$ $B_{m+3}$ and is independent of the Carryin $C_{m-1}$ to the four bit recoder. An analysis of Table 26 produce the following recoder.

$$8 = \overline{B_3}\, B_2\, B_1 + B_3\, \overline{B_2}\, \overline{B_1} \qquad [15a]$$
$$4 = \overline{B_3}\, (\overline{B_2}\, B_1 + B_2\, \overline{B_1}) \qquad [15b]$$
$$-4 = B_3\, (\overline{B_2}\, B_1 + B_2\, \overline{B_1}) \qquad [15c]$$
$$2 = \overline{C_{-1}}\, \overline{B_1}\, B_0 \qquad [15d]$$
$$-2 = C_{-1}\, B_1\, \overline{B_0} \qquad [15e]$$
$$1 = \overline{B_1}\, (\overline{C_{-1}}\, B_0 + C_{-1}\, \overline{B_0}) \qquad [15f]$$
$$-1 = B_1\, (\overline{C_{-1}}\, B_0 + C_{-1}\, \overline{B_0}) \qquad [15g]$$
$$C_{m+3} = B_3\, (B_2 + B_1) \qquad [15h]$$

FIGS. 9a and 9b show a 3 to 1 and a 4 to 1 multiplexer respectively which use the recoded signals of equations [15a] through [15g].

As an alternative, Table 26 may produce the equations [16a] through [16g] as follows:

$$8 = \overline{B_3}\, B_2\, B_1 + B_3\, \overline{B_2}\, \overline{B_1} \qquad [16a]$$
$$4 = \overline{B_2}\, B_1 + B_2\, \overline{B_1} \qquad [16b]$$
$$2 = \overline{C_{-1}}\, B_1\, \overline{B_0} + C_{-1}\, \overline{B_1}\, B_0 \qquad [16c]$$
$$1 = \overline{C_{-1}}\, B_0 + C_{-1}\, \overline{B_0} \qquad [16d]$$
$$X = B_3\, (\overline{B_2}\, B_1 + B_2\, \overline{B_1}) \qquad [16e]$$
$$Y = B_1\, (\overline{B_0} + \overline{C_{-1}}) \qquad [16f]$$
$$C_{m+3} = B_3\, (B_2 + B_1) \qquad [16g]$$

Figure 11:
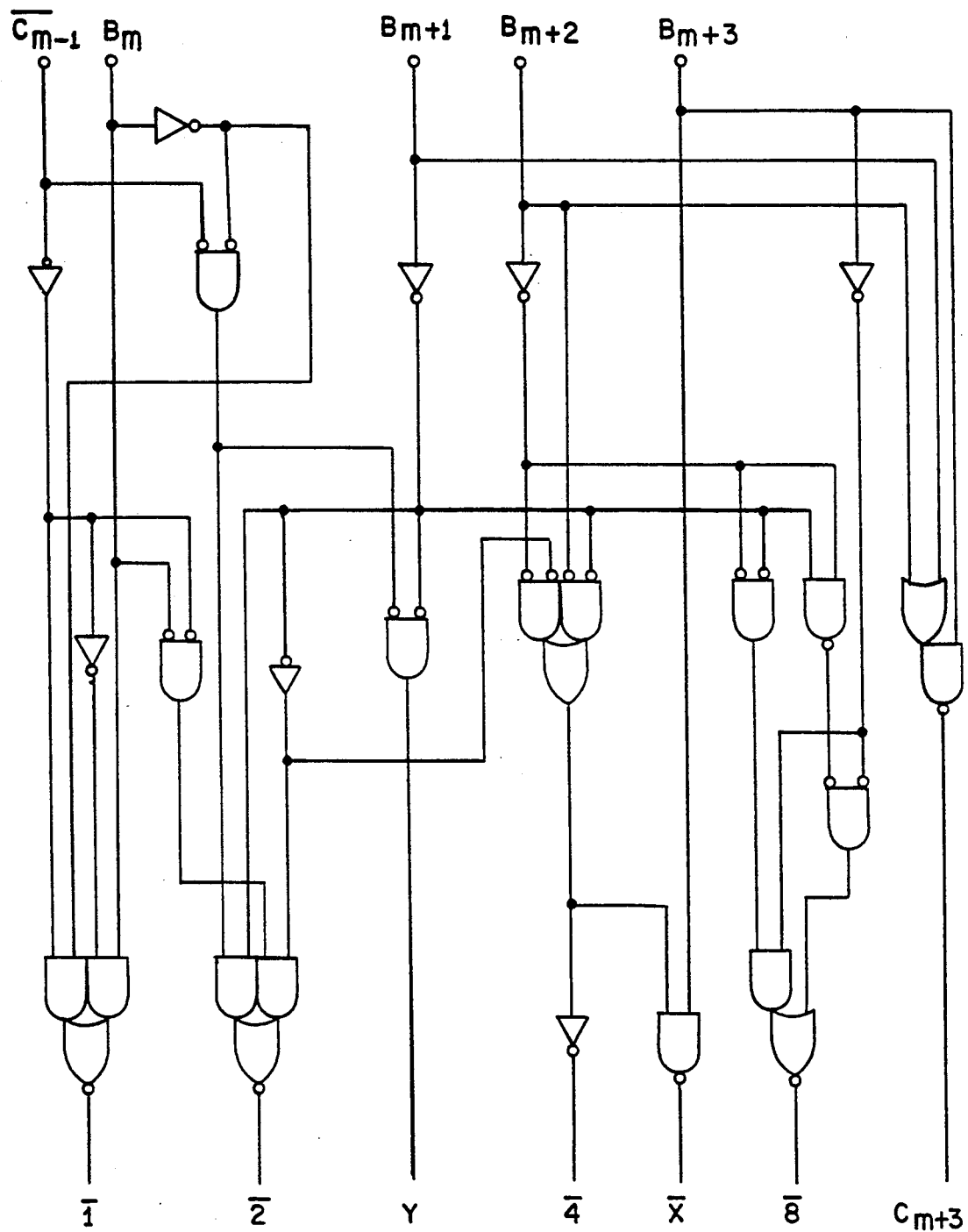
FIG. 11 is a logic diagram of a four-bit recoder according to the principles of the present invention.

Equations [16a] through [16d] produced recoded bits 8, 4 2 and 1 irrespective of sign. These are used with the controls X and Y of equations [16 e] and [16 f] to determine the sign of the multipliers 8, 4, 2 and 1. An implementation of a multiplexer using the recoded controls of equations [16a] through [16f] are illustrated n FIG. 10a for the X multiplexer and FIG. 10b for the Y multiplexer. A recoded implementing the equations [16a] through [16f] is illustrated in FIG. 11.

The four-bit recoding scheme of Tables 26 and 27 are for all but the most significant bit which would be treated with any of the techniques described above when the multiplicand B is a negative two's complement number. Although the present invention has been described with respect to two and four-bit recoding, any number of bits can be recoded using any of those schemes described herein. A three bit recoder using two multiplexers X and Y is illustrated in Table 28

TABLE 28

| $B_{m+2}$ | $B_{m+1}$ | $B_m$ | $C_{m-1}$ | $X_m$ | $Y_m$ | $C_{m+2}$ |
|---|---|---|---|---|---|---|
| 0 | 0 | 0 | 0 | 0 | 0 | 0 |
| 0 | 0 | 0 | 1 | 0 | 1 | 0 |
| 0 | 0 | 1 | 0 | 0 | 1 | 0 |
| 0 | 0 | 1 | 1 | 0 | 2 | 0 |
| 0 | 1 | 0 | 0 | 4 | −2 | 0 |
| 0 | 1 | 0 | 1 | 4 | −1 | 0 |
| 0 | 1 | 1 | 0 | 4 | −1 | 0 |
| 0 | 1 | 1 | 1 | 4 | 0 | 0 |
| 1 | 0 | 0 | 0 | 4 | 0 | 0 |
| 1 | 0 | 0 | 1 | 4 | 1 | 0 |
| 1 | 0 | 1 | 0 | 4 | 1 | 0 |
| 1 | 0 | 1 | 1 | 4 | 2 | 0 |
| 1 | 1 | 0 | 0 | 0 | −2 | 1 |
| 1 | 1 | 0 | 1 | 0 | −1 | 1 |
| 1 | 1 | 1 | 0 | 0 | −1 | 1 |
| 1 | 1 | 1 | 1 | 0 | 0 | 1 |

The logic for implementing a partial product complementing carry $C_m$ using the store one's complement signal SC of equation [14] is illustrated in FIG. 12a for a two bit recoding scheme and in FIG. 12b for a four bit recoding scheme. $\overline{SC}$ is the store one's complement of equation [14], $A_0$ is the first bit of the multiplicand and Y is the multiplexer control of equation [16f].

A review of Tables 27 and 28 reveals of a pattern of recoding bit groups of any size K or $B_{m+K-1}-B_{m+1}$, $B_m$ into L recoded multiplier stages $J_i$ and a Carryout $C_{m+K-1}$ where $L=K/2$ for K even and $(K+1)/2$ for K odd and i is odd from 1 to $2L-1$. Thus for $K=4$ for Table 27 and $K=3$ for Table 28, there are two stages or multiplexers (L=2), namely $J_1=Y$ and $J_3=X$. For bit groups of 5 and 6, there would be three stages or multiplexers $J_1, J_3, J_5$. The first stage is recoded to having the repeating pattern for the length of the recoding scheme of Table 29.

TABLE 29

| $B_{m+1}$ | $B_m$ | $C_{m-1}$ | $J_1$ |
|---|---|---|---|
| 0 | 0 | 0 | 0 |
| 0 | 0 | 1 | 1 |
| 0 | 1 | 0 | 1 |
| 0 | 1 | 1 | 2 |
| 1 | 0 | 0 | −2 |
| 1 | 0 | 1 | −1 |
| 1 | 1 | 0 | −1 |
| 1 | 1 | 1 | 0 |

The pattern of $J_1$, is repeated $2^{K-2}$ times or twice for $K=3$ and for times for $K=4$.

The high order stages $J_3$ through $J_{K-1}$ for K even and $J_3$ through $J_{K-2}$ for K odd has the repeating pattern of Table 30 for the length indicated except for the less significant and most significant set of zeros.

TABLE 30

0 for $2^i$

TABLE 30-continued 1 for $2^i$
2 for $2^i$
−1 for $2^i$
0 for $2^i$

The length for the least significant set for zero's is $2^2+2^4\ldots 2^{i-1}$ and for the most significant set of zero's is $2^2+2^3+2^5\ldots 2^{i-2}$. Thus in Table 27 where $K=4$, $L=2$, $i=3$, the least significant set of zeros have a length of $2^2$ or 4 for the second stage $J_3$ or X. As a further example, for $K=6$, $L=3$, the second stage $J_3$ is the same having 4 most and least significant zeros and the third stage $J_5$ having $i=5$, would have $2^2+2^4=20$ least significant zeros and $2^2+2^3=12$ most significant zeros.

The most significant stage $J_{K-1}$ for K odd has the pattern of Table 31 for the length indicated

TABLE 31

0 for $2^2 + 2^4 + 2^{i-1}$
1 for $2^i$
0 for $2^2 + 2^3 + 2^5 \ldots 2^{i-2}$

This is Table 28 where $K=3$, $L=2$, $i=3$, the pattern for the second step $J_3$ is $2^2$ or 4 zeros followed by $2^3$ or 8 ones followed by $2^2$ or 4 zeros. For $K=5$, $L=3$, $i=5$, the pattern for the third stage $J_5$ is $2^2+2^4$ or 20 zeros followed by $2^5$ or 32 ones, followed by $2^2+2^3$ or 12 zeros. Note that the number of least and most significant number of zeros is the same for a given stage whether the bit grouping is even or odd. The only difference for even or odd is the pattern between these zeros in the most significant stage.

A Carryout $C_{m+K-1}$ for the recoded pattern position greater than $2^2+2^4-2^K$ for K even and $2^2+2^4+2^{K-1}+2^K$ for K odd are generated except no Carryout is generated for the most significant bit group of a negative two's complement multiplier B. Thus in Table 27 for $K=4$, $i=3$ and Table 28 for $K=3$, $i=3$, the Carry $C_{m+3}$ and $C_{m+2}$ respectively begin after position $2^2+2^4$ or 20 and $2^2+2^3$ or 12 respectively. For $K=6$, $i=5$ and $K=5$, $i=5$, the Carry $C_{m+5}$ and $C_{m+4}$ respectively begins after $2^2+2^4+2^6$ or 84 and $2^2+2^4+2^5$ or 52 positions respectively.

Thus the recoding of Tables 27 and 28 can be generalized for any value or magnitude of bit group K.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A multiplier for multiplying an N bit multiplicand A by an M bit multiplier B comprising:
   input means for receiving said multiplicand A and multiplier B;
   recoding means for recoding two-bit groups $B_{m+1}$; $B_m$ of said multiplier B received by said input means and a carryin $C_{m-1}$ to a recoded group multiplier $b_m$ and carryout $C_{m+1}$ for all bit pairs of unsigned multiplier B and all but the most significant bit pair of a negative two's complement multiplier B as follows:

| $B_{m+1}$ | $B_m$ | $C_{m-1}$ | $b_m$ | $C_{m+1}$ |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 2 | 0 |
| 1 | 0 | 0 | 2 | 0 |
| 1 | 0 | 1 | −1 | 1 |
| 1 | 1 | 0 | −1 | 1 |
| 1 | 1 | 1 | 0 | 1 | and the most significant bit pair of a negative two's complement multiplier B as follows:

| $B_{M-1}$ | $B_{M-2}$ | $C_{M-3}$ | $b_{M-2}$ | $C_{M-1}$ |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 2 | 0 |
| 1 | 0 | 0 | 2 | −1 |
| 1 | 0 | 1 | −1 | 0 |
| 1 | 1 | 0 | −1 | 0 |
| 1 | 1 | 1 | 0 | 0 | partial product means for forming partial products $P_m = b_m \times A \times 2^m$ for each recoded multiplier $b_m$ and carry partial product $P_c C_{M-1} \times A \times 2^M$ for carryout of the most significant recoded bit;

sign extension means for providing sign extension for negative partial products; and add means for receiving, aligning and adding said partial products $P_m$ and $P_c$ and said sign extension to produce a final product.

2. A multiplier according to claim 1 wherein said sign extension means provides a single sign extension word, for all negative partial products, as a plurality of negative bits, beginning with a sign bit of a first negative partial product and extending to a $2^{M+M-1}$ bit, except for positive sign bits for sign bits of subsequent negative partial products.

3. A multiplier according to claim 1 wherein said sign extension means forms said single sign extension word as a two's complement of collection of sign bits of said partial products.

4. A multiplier for multiplying an N bit multiplicand A by an M bit multiplier B comprising:

input means for receiving said multiplicand A and multiplier B;

recoding means for recoding two-bit groups $B_{m+1}$; $B_m$ of said multiplier B received by said input means and a carryin $C_{m-1}$ to a recoded group multiplier $b_m$ and carryout $C_{m+1}$ as follows:

| $B_{m+1}$ | $B_m$ | $C_{m-1}$ | $b_m$ | $C_{m+1}$ |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | −2 | 1 |
| 1 | 0 | 0 | −2 | 1 |
| 1 | 0 | 1 | −1 | 1 |
| 1 | 1 | 0 | −1 | 1 |
| 1 | 1 | 1 | 0 | 1 | except no carryout is produced for the most significant bit pair of a negative two's complement multiplier B;

partial product means for forming partial products $P_m = b_m \times A \times 2^m$ for each recoded multiplier $b_m$ and carry partial product $P_c = C_{M-1} \times A \times 2^M$ for carryout of the most significant recoded bit;

sign extension means for providing sign extension for negative partial products; and add means for receiving, aligning and adding said partial products $P_m$ and $P_c$ and said sign extension to produce a final product.

5. A multiplier for multiplying an N bit multiplicand A by an M bit multiplier B comprising:

input means for receiving said multiplicand A and multiplier B;

recoding means for recoding three bit groups $B_{m+2}$; $B_{m+1}$; $B_m$ of said multiplier B received by said input means and carryin $C_{m-1}$ to two recoded multipliers $X_m$; $Y_m$ and carryout $C_{m+2}$ as follows:

| $B_{m+2}$ | $B_{m+1}$ | $B_m$ | $C_{m-1}$ | $X_m$ | $Y_m$ | $C_{m+2}$ |
|---|---|---|---|---|---|---|
| 0 | 0 | 0 | 0 | 0 | 0 | 0 |
| 0 | 0 | 0 | 1 | 0 | 1 | 0 |
| 0 | 0 | 1 | 0 | 0 | 1 | 0 |
| 0 | 0 | 1 | 1 | 0 | 2 | 0 |
| 0 | 1 | 0 | 0 | 4 | −2 | 0 |
| 0 | 1 | 0 | 1 | 4 | −1 | 0 |
| 0 | 1 | 1 | 0 | 4 | −1 | 0 |
| 0 | 1 | 1 | 1 | 4 | 0 | 0 |
| 1 | 0 | 0 | 0 | 4 | 0 | 0 |
| 1 | 0 | 0 | 1 | 4 | 1 | 0 |
| 1 | 0 | 1 | 0 | 4 | 1 | 0 |
| 1 | 0 | 1 | 1 | 4 | 2 | 0 |
| 1 | 1 | 0 | 0 | 0 | −2 | 1 |
| 1 | 1 | 0 | 1 | 0 | −1 | 1 |
| 1 | 1 | 1 | 0 | 0 | −1 | 1 |
| 1 | 1 | 1 | 1 | 0 | 0 | 1 | except no carryout is produced for the most significant bits of a negative two's complement multiplier B;

partial product means for forming partial products $P_m$ for each recoded multiplier $X_m$ and $Y_m$ and carry partial product $P_c$ for carryout of the most significant recoded bit group;

sign extension means for providing sign extension for negative partial products; and add means for receiving, aligning and adding said partial products $P_m$ and $P_c$ and said sign extension to produce a final product.

6. A multiplier for multiplying an N bit multiplicand by an M bit multiplier B comprising:

input means for receiving said multiplicand A and multiplier B;

recoding means for recoding four-bit groups $B_{m+3}$; $B_{m+2}$; $B_{m+1}$; $B_m$ of multiplier B received by said input means and a carryin $C_{m-1}$ to a two bit recoded group multiplier $X_m$, $Y_m$ and carryout $C_{m+3}$ as follows:

| $B_{m+3}$ | $B_{m+2}$ | $B_{m+1}$ | $B_m$ | $C_{m-1}$ | $X_m$ | $Y_m$ | $C_{m+3}$ | $C_{m-1}$ | $X_m$ | $Y_m$ | $C_{m+3}$ |
|---|---|---|---|---|---|---|---|---|---|---|---|
| 0 | 0 | 0 | 0 | 0 | 0 | 0 | 0 | 1 | 0 | 1 | 0 |
| 0 | 0 | 0 | 1 | 0 | 0 | 1 | 0 | 1 | 0 | 2 | 0 |

-continued

| $B_{m+3}$ | $B_{m+2}$ | $B_{m+1}$ | $B_m$ | $C_{m-1}$ | $X_m$ | $Y_m$ | $C_{m+3}$ | $C_{m-1}$ | $X_m$ | $Y_m$ | $C_{m+3}$ |
|---|---|---|---|---|---|---|---|---|---|---|---|
| 0 | 0 | 1 | 0 | 0 | 4 | −2 | 0 | 1 | 4 | −1 | 0 |
| 0 | 0 | 1 | 1 | 0 | 4 | −1 | 0 | 1 | 4 | 0 | 0 |
| 0 | 1 | 0 | 0 | 0 | 4 | 0 | 0 | 1 | 4 | 1 | 0 |
| 0 | 1 | 0 | 1 | 0 | 4 | 1 | 0 | 1 | 4 | 2 | 0 |
| 0 | 1 | 1 | 0 | 0 | 8 | −2 | 0 | 1 | 8 | −1 | 0 |
| 0 | 1 | 1 | 1 | 0 | 8 | −1 | 0 | 1 | 8 | 0 | 0 |
| 1 | 0 | 0 | 0 | 0 | 8 | 0 | 0 | 1 | 8 | 1 | 0 |
| 1 | 0 | 0 | 1 | 0 | 8 | 1 | 0 | 1 | 8 | 2 | 0 |
| 1 | 0 | 1 | 0 | 0 | −4 | −2 | 1 | 1 | −4 | −1 | 1 |
| 1 | 0 | 1 | 1 | 0 | −4 | −1 | 1 | 1 | −4 | 0 | 1 |
| 1 | 1 | 0 | 0 | 0 | −4 | 0 | 1 | 1 | −4 | 1 | 1 |
| 1 | 1 | 0 | 1 | 0 | −4 | 1 | 1 | 1 | −4 | 2 | 1 |
| 1 | 1 | 1 | 0 | 0 | 0 | −2 | 1 | 1 | 0 | −1 | 1 |
| 1 | 1 | 1 | 1 | 0 | 0 | −1 | 1 | 1 | 0 | 0 | 1 | except no carryout is produced for the most significant bits of a negative two's complement multiplier B;

partial product means for forming partial products $P_m$ for each recoded multiplier $X_m$ and $Y_m$ and carry partial product $P_c$ for carryout of the most significant recoded bit group;

sign extension means for providing sign extension for negative partial products; and add means for receiving, aligning and adding said partial products $P_m$ and $P_c$ and said sign extension to produce a final product.

7. A multiplier according to claim 6 wherein said partial product means includes a multiplexer for each partial product, and said sign extension means includes a multiplexer for forming a single sign extension word.

8. A multiplier for multiplying an N bit multiplicand A by an M bit multiplier B comprising:

input means for receiving said multiplicand A and multiplier B;

recoding means for recoding K bit groups $B_{M+K-1} \ldots B_{M+1}$; $B_m$ of said multiplier B received by said input means, where K is greater than 2, into L recoded multipliers stages $J_1$ and carryout $C_{M+K-1}$ where L=K/2 for K even and (K+1)/2 for K odd and i is odd from 1 to 2L−1 as follows:

a) recoded multiplier stage $J_1$ has the following repeating pattern

| $B_{m+1}$ | $B_m$ | $C_{m-1}$ | $J_1$ |
|---|---|---|---|
| 0 | 0 | 0 | 0 |
| 0 | 0 | 1 | 1 |
| 0 | 1 | 0 | 1 |
| 0 | 1 | 1 | 2 |
| 1 | 0 | 0 | −2 |
| 1 | 0 | 1 | −1 |
| 1 | 1 | 0 | −1 |
| 1 | 1 | 1 | 0 | b) recoded multiplier stages $J_3$ through $J_{K-1}$ for K even and $J_3$ through $K_{K-3}$ for K odd has the following repeating pattern 0 for $2^1$
1 for $2^1$
2 for $2^1$
−1 for $2^1$
0 for $2^1$ except the less significant and most significant set of zeros which have a length of $2^2+2^4 \ldots 2^{i-1}$ for the less significant set of zeros and a length of $2^2+2^3+2^5 \ldots 2^{i-1}$ for the most significant set of zeros c) recoded multiplier stage $J_{K-1}$ for K odd has the following pattern
0 for $2^2+2^4+2^{i-1}$
0 for $2^i$
0 for $2^2+2^3+2^5-2^{i-2}$ d) generate a carryout $C_{M+K-1}$ for recoded pattern positions greater than $2^2+2^4 \ldots 2^K$ for K even and $2^2+2^4 \ldots 2^{K-1}+2^K$ for K odd except no carryout is generated for the most significant bit group of a negative two's complement multiplier B;

partial product means for forming partial products $P_m$ for each recoded multiplier $X_m$ and $Y_m$ and carry partial product $P_c$ for carryout of the most significant recoded bit group;

sign extension means for providing sign extension for negative partial products; and add means for receiving, aligning and adding said partial products $P_m$ and $P_c$ and said sign extension to produce a final product.

9. A multiplier for multiplying an N bit multiplicand A by an M bit multiplier B wherein A and B are coded or recoded unsigned or two's complement numbers, comprising:

input means for receiving said multiplicand A and multiplier B;

partial product means for forming a plurality of partial products $P_m = A \times B_m \times 2^m$ of said multiplicand A and multiplier B received by said input means;

sign extension means, operating in parallel with said partial product means for providing a single sign extension word SEW as a function of said multiplicand A and multiplier B received by said input means; and add means for receiving, aligning and adding said plurality of partial products $P_m$ and said sign extension word SEW to produce a final product.

10. A multiplier according to claim 9 wherein said sign extension means forms said sign extension word SEW as a plurality of negative sign bits, beginning with a sign bit of a first negative partial product and extending to a $2^{M+M-1}$ bit, except for positive sign bits for sign bits of subsequent negative partial products.

11. A multiplier according to claim 10 wherein said sign extension means includes:

collecting means for determining and collecting sign bits of said partial products as a sign word; and a first complementing means for forming said sign extension word SEW as a two's complement of said sign word.

12. A multiplier according to claim 11 wherein said first complementing means adds one to a one's complement of said sign word.

13. A multiplier according to claim 10 wherein said sign extension means uses the sign of the coded or recoded multiplicand, the sign of the coded or recoded multiplier, and the law of signs to determine the sign of partial products, except that a coded or recoded multiplier of zero is considered a positive partial product.

14. A multiplier according to claim 9 wherein said sign extension means includes:
collecting means for determining and collecting sign bits of said partial products as a sign word; and
a first complementing means for forming said sign extension word SEW as a two's complement of said sign word.

15. A multiplier according to claim 14 wherein said first complementing means adds one to a one's complement of said sign word.

16. A multiplier according to claim 14 wherein said first complementing means adds a first complementing carry to a one's complement of said sign word;
wherein said partial product means includes a second complementing means for adding a second complementing carry to one's complement of said multiplicand A as negative partial products $P_m$; and
including pre-adder means for determining the position of said first complementing carry and the occurrence of a second complementing carry for the last partial product and for adding said first complementing carry and said last partial product complementing carry to said multiplicand A as a partial product.

17. A multiplier according to claim 16 wherein said first complementing carry and said last partial products complementing carry as a 1.

18. A multiplier according to claim 16 wherein said pre-adder means adds said complementing carries to said multiplicand A as said last partial product.

19. A multiplier according to claim 16 including recoded means for recoding said multiplier B; and
wherein said pre-adder means determines the position of said first complement carry from the last significant bit of said recoded multiplier and occurrence of a second complementing carry from the sign of said multiplier B and necessity of an extra partial product as said last partial product.

20. A multiplier according to claim 19 wherein said partial product means and said pre-adder means operate in parallel.

21. A multiplier according to claim 9 wherein said partial product means and said sign extension means operate in parallel.

22. A multiplier according to claim 14 wherein said sign extension means uses the sign of the coded or recoded multiplicand, the sign of the coded or recoded multiplier, and the law of signs to determine the sign of partial products, except that a coded or recoded multiplier of zero is considered a positive partial product.

23. A multiplier/accumulator for an N bit multiplicand A and an M bit multiplier B comprising:
input means for receiving said multiplicand A and multiplier B;
partial product means for forming a plurality of partial products $P_m$ of said multiplicand A and multiplier B received by said input means;
accumulator register means having a capacity of R bits where R is greater than Q where $Q = M + N$;
array means for adding said plurality of partial products and the least significant bits from the accumulator register means and providing a sum S and a carry C of N bits each,
product sign extension means operating in parallel with said partial product means and array means for providing a product sign extension word PSEW as a function of said multiplicand A and multiplier B to extend said sum S and carry C to R bits; and
final adder means for receiving, aligning and adding said sum S, carry C, product sign extension word PSEW and most significant bits $X_{R-1} \ldots X_q$ of said accumulator register means.

24. A multiplier/accumulator according to claim 23 wherein said final adder means includes merging means for merging said sum S, carry C, product sign extension word PSEW and most significant bits $X_{R-1} \ldots X_q$ into two merged words of R bits and simple adder means for adding said two merged words.

25. A multiplier/accumulator according to claim 24 wherein said product sign extension means, for a product sign extension having a least significant bit of 1, provides a product sign extension word PSEW =

$$\overline{X}_{R-1} \ldots \overline{X}_{R-2}; \text{ and}$$

said merging means produces the following two merged words:

| $\overline{X}_{R-1}$ | $\overline{X}_{R-2} \ldots \overline{X}_{Q+1}$ | $\overline{X}_Q$ | $S_{Q-1}$ | $S_{Q-2} \ldots S_1$ | $S_0$ |
|---|---|---|---|---|---|
| $X_{R-2}$ | $X_{R-3} \ldots X_Q$ | $C_{Q-1}$ | $C_{Q-2}$ | $C_{Q-3} \ldots C_0$ | 0 |

26. A multiplier/accumulator according to claim 24 wherein said product sign extension means, for a product sign extension having a least significant bit of 1, provides a product extension word PSEW = $\overline{C}_{Q-1} \ldots \overline{C}_{Q-1}$; and
said merging means produces the following two merged words:

| $\overline{C}_{Q-1}$ | $\overline{C}_{Q-1}$ | $\overline{C}_{Q-1}$ | $\overline{C}_{Q-1}$ | $S_{Q-1}$ | $S_{Q-2} \ldots S_1$ | $S_0$ |
|---|---|---|---|---|---|---|
| $X_{R-1}$ | $X_{R-2} \ldots X_{Q+1}$ | $X_Q$ | $C_{Q-2}$ | $C_{Q-3} \ldots C_0$ | | |

27. A multiplier/accumulator according to claim 24 wherein:
said product sign extension means, for a product sign extension having a least significant bit of 0, provides a product sign extension word PSEW = $1_{R-1}1_{R-2} - 1_{Q-1}0_Q$; and
said merging means produces the follow two merged words:

| $\overline{X}_{R-1}$ | $\overline{X}_{R-2} \ldots \overline{X}_{Q+2}$ | $\overline{X}_{Q1}$ | $X_Q$ | $S_{Q-1}$ | $S_{Q-2} \ldots S_1$ | $S_0$ |
|---|---|---|---|---|---|---|
| $X_{R-2}$ | $X_{R-3} \ldots X_{Q+1}$ | $X_Q$ | $C_{Q-1}$ | $C_{Q-2}$ | $C_{Q-3} \ldots C_0$ | 0. |

28. A multiplier/accumulator according to claim 23 wherein said product sign extension means determines a product sign extension PSEW having a least significant bit of 0 for
a) a negative two's complement multiplicand A and an unsigned multiplier B whose most significant bit group using bit group coding produces a carry; and b) a positive multiplicand A and a negative two's complement multiplier B whose most significant bit group using bit group coding produces a carry.

29. A multiplier for multiplying an N bit multiplicand A by an M bit multiplier B wherein A and B are coded or recoded unsigned and two's complement numbers comprising:

input means receiving said multiplicand A and multiplier B;

partial product means for forming a plurality of partial products $P_{m=A \times B_m} \times 2^m$ of multiplicand A and multiplier B received by said input means;

first complementing means for adding a complementing carry of a one's complement of the least significant bit of multiplicand A to the second least significant bit of a one's complement of all bits of A except the least significant bit of A which is uncomplemented as follows:

$$\text{two's complement of } A = \overline{A}_{N-1}, \quad \overline{A}_{N-2} \ldots \overline{A}_1, A_0$$
$$+ \quad \overline{A}_0$$

to form a two's complement of A for a negative partial product; and adder means for receiving, aligning and adding said plurality of partial products to produce a final product.

30. A multiplier according to claim 29 including:

second complementing means for adding a complementing carry of one to the least significant bit of a one's complement of all bits of multiplicand A; and selections means for selecting said first or said second complementing means to form two's complement of A for a negative partial product.

31. A multiplier according to claim 30 wherein said selection means selects said first complementing means to form a two's complement of said multiplicand A for a coded or recoded multiplier bit of −1 and selects said second complementing means to form a two's complement of said multiplicand A for a coded or recoded multiplier bit of −2.

32. A multiplier according to claim 30 wherein said selection means selects said first or second complementing means such that the complementing carry is always added to the second least significant bit of said partial product $P_m$.

33. A multiplier according to claim 30 including:

a multiplicand register; and sign-magnitude means for controlling said multiplier to perform multiplication of said multiplicand A and multiplier B as unsigned or two's complement numbers by separately processing a sign bit and absolute value bits of a sign magnitude multiplicand A or multiplier B.

34. A multiplier according to claim 33 wherein said sign-magnitude means, for a multiplicand A having a negative sign, stores one's complement of said absolute value bits of said multiplicand A in said multiplicand register and controls said selection means to select said first or second complementing means to form two's complement of A for positive partial products.

35. A multiplier according to claim 34 wherein said selection means selects said first complementing means to form a two's complement of said multiplicand A for a coded or recoded multiplier bit of +1 and selects said second complementing means to form a two's complement of said multiplicand A for a coded or recoded multiplier bit of +2.

36. A multiplier according to claim 34 including a recoding means for recoding said multiplier B; and wherein said recoding means and said sign-magnitude means operate in parallel.

37. A multiplier according to claim 36 wherein said sign-magnitude means, for a multiplier B having a negative sign, forms one's complement $\overline{B}$ of absolute value bits of said multiplier B and adds one to B's least significant bit during recoding.

38. A multiplier according to claim 36 wherein said sign-magnitude means, for a multiplicand A have negative sign, provides as a partial product $P_m$ for negative partial products, a one's complement of said multiplicand $\overline{A}$ in said multiplicand register.

39. A multiplier for multiplying an N bit multiplicand A and an M bit multiplier B, to produce an N+M bit product P wherein coded or recoded A and B and P are two's complement, sign-magnitude or unsigned format numbers comprising:

multiplicand register means for storing a multiplicand A multiplier register means for storing a recoded multiplier B;

format means for determining the formats of the multiplicand A, multiplier B and product P and storing multiplicand A or a ones complement $\overline{A}$ of multiplicand A in said multiplicand register means as a function of the determined formats;

partial product means for forming a plurality of partial products $P_m = A \times B_m \times 2^m$;

complementing means for forming two's complement of said multiplicand A, which is in said multiplicand register means, as negative partial products and for forming two's complement of said multiplicand $\overline{A}$, which is in said multiplicand register means, as positive partial products; and adder means for adding said plurality of partial products to produce a product P.

40. A multiplier according to claim 39 including a recoding means for recoding said multiplier B.

41. A multiplier according to claim 40 wherein said format means, for a multiplier B having a negative sign, forms one's complement $\overline{B}$ of absolute value bits of said multiplier $\overline{B}$ and adds one to B's least significant bit during recording.

42. A multiplier according to claim 37 wherein said format means, for a multiplicand A having a negative sign, stores the absolute value bits of A or a one's complement $\overline{A}$ of said multiplicand A in said multiplicand register means.

43. A multiplier according to claim 37 wherein said format means, for a multiplicand A, multiplier B and product P in sign-magnitude format, provides the absolute value bits of the multiplicand A and recoded multiplier B to their respective register means and affixes a sign to the product using the law of signs.

44. A multiplier according to claim 39 wherein said complementing means forming a one's complement of said multiplicand $\overline{A}$, which is in said multiplicand register, as negative partial products.

45. A multiplier according to claim 39 wherein said complementing means adds a complementing carry to a one's complement of multiplicand A, which is in said multiplicand register means to form a two's complement as negative partial products and adds a complementing carry to said multiplicand $\overline{A}$, which is in said multiplicand register means, to form a two's complement as positive partial product.

46. A multiplier according to the claim 39 wherein said format means stores a one's complement $\overline{A}$ in said multiplicand register if:

$$SC=(S+U)_p[(T^-)_A\oplus(T^-)_B]+T_p[(S^-)_A\oplus(S^-)_B]$$

wherein
T is two's complement format
U is unsigned format
S is sign-magnitude format
subscript p is product format
subscript A is multiplicand format
subscript B is multiplier format
superscript + is positive number
superscript − is negative number.

47. A complex multiplier for (A+jB) (C+jD) comprising:
first and second multiplicand register means for storing A and B respectively;
first and second multiplier register means for storing reduced C and D respectively;
first partial product means for forming a first plurality of partial products $P_{mAC}=A\times C_m\times 2^m$;
second partial product means for forming a second plurality of partial products $P_{mBD}=-B\times D_m\times 2^m$;
third partial product means for forming a third plurality of partial products $P_{mAD}=A\times D_m\times 2^m$;
fourth partial product means for forming a fourth plurality of partial products $P_{mBC}=B\times C_m\times 2^m$
first complementing means for forming two's complement of A as negative partial product $P_{mAC}$;
second complementing means for forming two's complement of B as positive partial products $P_{mBD}$;
third complementing means for forming a two's complement of A as a negative partial products $P_{mAD}$;
fourth complementing means for forming two's complement of B as negative partial products $P_{mBC}$;
first adding means for adding said first and second plurality of partial products to product a first final product $P_R=AC-BD$; and
second adding means for adding said third and fourth plurality of partial products to produce a second final product $P_1=AD+BC$.

48. A complex multiplier according to claim 47 including first and second recoding means for recoding C and D respectively before forming said pluralities of partial products.

49. A complex multiplier according to claim 47 wherein said first and second adding means each include array means for adding two pluralities of partial products and providing a sum S and a carry C; and
final adder means for adding said sum S and C to produce a final product.

50. A complex multiplier according to claim 47 wherein each of said complementing means includes
first complementor means for adding one's complement of the least significant bit of a multiplicand A/B to the second least significant bit of the one's complement of all bits of the multiplicand except the least significant bit of the multiplicand A/B as follows:

$$\overline{A/B_{N-1}}\ \overline{A/B_{N-2}}\ldots\overline{A/B_1}\ A/B_0$$
$$A/B_0$$

to form a two's complement of a multiplicand A/B;
second complementor means for adding a complementing carry of one to the least significant bit of a one's complement of all bits of multiplicand A/B; and
selections means for selecting said first or said second complementor means to form two's complement of A/B.

51. A complex multiplier according to claim 50, wherein said selection means, of said first, third and fourth complementing means, selects said first complementor means to form a two's complement of said multiplicand A/B for a multiplier bit of −1 and selects said second complementor means to form a two's complement of said multiplicand A/B for multiplier bit of −2; and
wherein for said selection means, of said second complementing means, selects said first complementor means to form of two's complement of said multiplicand B for a multiplier bit of 1 and selects said second complementor means to form a two's complement of said multiplicand B for a multiplier bit of 2.

52. A complex multiplier according to claim 47 including:
format means for determining the format of the multiplicands A and B, multipliers C and D and final products $P_R$ and $P_1$ and storing multiplicands A, B or one's complement $\overline{A},\overline{B}$ of multiplicands A, B in said first and second multiplicand register means as a function of the determined formats;
said first, third and fourth complementing means forms a two's complement of $\overline{A},\overline{B}$ which is in a respective multiplicand register means as positive partial products; and
said second complementing means forms a two's complement of $\overline{B}$, which is in said second multiplicand register means, as negative partial products.

53. A complex multiplier according to claim 52, wherein said first, third and fourth complementing means forms a one's complement of said multiplicands A, B, which is in a respective multiplicand register means, as negative partial products; and
said second complementing means forms a one's complement of said multiplicand $\overline{B}$, which is in said second multiplicand register means, as positive partial product.

54. A complex multiplier according to claim 52, wherein:
said first, third and fourth complementing means adds a complementing carry to a one's complement of multiplicand A, B, which is in said multiplicand register means to form a two's complement as negative partial products and adds a complementing carry to said multiplicand $\overline{A},\overline{B}$, which is in said multiplicand register means, to form a two's complement as positive partial product; and
said second complementing means adds a complementing carry to a one's complement of multiplicand B, which is in said multiplicand register means to form a two's complement as positive partial products and adds a complementing carry to said multiplicand $\overline{B}$, which is in said multiplicand register means, to form a two's complement as negative partial product.

55. A complex multiplier according to claim 52 wherein said format means stores a one's complement $\overline{A}$ in said multiplicand register if $$SC = (S+U)_p[(T^-)_A \oplus (T^-)_B] + T_p[(S^{-1})_A \oplus (S^-)_B]$$

wherein
T is two's complement format
U is unsigned format
S is sign magnitude format
subscript p is product format
subscript A is multiplicand format
subscript B is multiplier format
superscript + is positive format
superscript − is negative format.

* * * * *